United States Patent
Li et al.

(10) Patent No.: US 8,805,276 B2
(45) Date of Patent: Aug. 12, 2014

(54) METHOD, SYSTEM, RELAY STATION AND BASE STATION FOR TRANSMITTING DATA MOBILE COMMUNICATION

(75) Inventors: Hui Li, Beijing (CN); Ping Li, Shanghai (CN); Tao Liu, Beijing (CN); Xinglin Wang, Beijing (CN); Yi Sheng Xue, Beijing (CN); Dan Yu, Beijing (CN); Wolfgang Zirwas, München (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 1042 days.

(21) Appl. No.: 12/449,247

(22) PCT Filed: Jan. 30, 2008

(86) PCT No.: PCT/EP2008/051150
§ 371 (c)(1),
(2), (4) Date: Jan. 22, 2010

(87) PCT Pub. No.: WO2008/092908
PCT Pub. Date: Aug. 7, 2008

(65) Prior Publication Data
US 2010/0285743 A1   Nov. 11, 2010

(30) Foreign Application Priority Data
Jan. 30, 2007   (CN) .......................... 2007 1 0063175

(51) Int. Cl.
*H04B 7/14*   (2006.01)
(52) U.S. Cl.
USPC ................ 455/15; 370/229; 370/276; 455/11
(58) Field of Classification Search
CPC .............................. H04B 7/2606; H04W 84/08
USPC ............................................................ 455/15
See application file for complete search history.

(56) References Cited

U.S. PATENT DOCUMENTS

| 5,241,686 A | | 8/1993 | Charbonnier |
| 5,796,722 A | * | 8/1998 | Kotzin et al. .................. 370/252 |

(Continued)

FOREIGN PATENT DOCUMENTS

| FR | 2 697 390 | | 4/1994 |
| GB | 2 406 018 A | | 3/2005 |

(Continued)

OTHER PUBLICATIONS

Shen Gang et al: "Handover Schemes in IEEE802.16J" Internet Citation, [Online] XP002462478 Retrieved from the Internet on Dec. 14, 2007] p. 5.

(Continued)

*Primary Examiner* — Hai V Nguyen
(74) *Attorney, Agent, or Firm* — Staas & Halsey LLP

(57) ABSTRACT

A mobile communication data transmission method for a cell having one base station and more than one relay station involves switching the relay stations between at least two operating modes of signaling transmission under the control of the base station. A system transmits mobile communication data in a cell having one base station and more than one relay station. When transmitting an uplink signaling or a downlink signaling, the relay stations switch between at least two operating modes under the control of the base station. By using the method, network, relay station, and base station, data transmission in multiple modes can be achieved, so as to achieve a flexible relay scheme.

19 Claims, 9 Drawing Sheets

(56) References Cited

U.S. PATENT DOCUMENTS

| | | | |
|---|---|---|---|
| 5,815,795 A * | 9/1998 | Iwai | 455/9 |
| 5,822,698 A * | 10/1998 | Tang et al. | 455/447 |
| 5,839,075 A * | 11/1998 | Haartsen et al. | 455/450 |
| 5,903,834 A * | 5/1999 | Wallstedt et al. | 455/422.1 |
| 5,937,353 A * | 8/1999 | Fapojuwo | 455/444 |
| 5,960,352 A * | 9/1999 | Cherpantier | 455/451 |
| 6,108,550 A * | 8/2000 | Wiorek et al. | 455/447 |
| 6,125,280 A * | 9/2000 | Grandhi et al. | 455/446 |
| 6,233,229 B1 * | 5/2001 | Ranta et al. | 370/330 |
| 6,266,514 B1 * | 7/2001 | O'Donnell | 455/67.13 |
| 6,470,057 B1 * | 10/2002 | Hui et al. | 375/294 |
| 6,477,377 B2 * | 11/2002 | Backstrom et al. | 455/446 |
| 6,553,011 B1 * | 4/2003 | Yan et al. | 370/328 |
| 7,136,366 B2 * | 11/2006 | Kim | 370/331 |
| 7,236,804 B2 * | 6/2007 | Immendorf et al. | 455/557 |
| 7,317,922 B2 * | 1/2008 | Baccelli et al. | 455/453 |
| 7,526,247 B2 * | 4/2009 | Baker et al. | 455/11.1 |
| 7,565,222 B2 * | 7/2009 | Popelka | 700/244 |
| 7,599,341 B2 * | 10/2009 | Ramachandran | 370/338 |
| 7,683,827 B2 * | 3/2010 | Kelly et al. | 342/159 |
| 7,796,546 B2 * | 9/2010 | Lee et al. | 370/315 |
| 7,873,338 B2 * | 1/2011 | Visotsky et al. | 455/226.2 |
| 7,917,149 B2 * | 3/2011 | Chen et al. | 455/450 |
| 7,965,618 B2 * | 6/2011 | Zhou et al. | 370/203 |
| 7,969,949 B2 * | 6/2011 | Liu et al. | 370/337 |
| 8,000,657 B2 * | 8/2011 | Do et al. | 455/67.13 |
| 8,010,043 B2 * | 8/2011 | Miller | 455/12.1 |
| 8,126,472 B2 * | 2/2012 | Lee et al. | 455/451 |
| 8,134,979 B2 * | 3/2012 | Jin et al. | 370/335 |
| 8,150,445 B2 * | 4/2012 | Takeuchi et al. | 455/522 |
| 8,155,013 B2 * | 4/2012 | Jeong et al. | 370/248 |
| 8,155,016 B2 * | 4/2012 | Zhang et al. | 370/252 |
| 8,160,048 B2 * | 4/2012 | Du et al. | 370/346 |
| 8,160,501 B1 * | 4/2012 | Hyde et al. | 455/67.14 |
| 8,175,064 B2 * | 5/2012 | Tan et al. | 370/335 |
| 8,200,274 B2 * | 6/2012 | Lee et al. | 455/522 |
| 8,274,923 B2 * | 9/2012 | Shen et al. | 370/315 |
| 8,311,022 B2 * | 11/2012 | Du et al. | 370/338 |
| 8,346,160 B2 * | 1/2013 | Kummetz | 455/11.1 |
| 8,422,943 B2 * | 4/2013 | Saito et al. | 455/11.1 |
| 8,447,230 B2 * | 5/2013 | Mohebbi | 455/11.1 |
| 8,514,764 B2 * | 8/2013 | Baker et al. | 370/315 |
| 8,521,081 B2 * | 8/2013 | Kang et al. | 455/10 |
| 2004/0192204 A1 * | 9/2004 | Periyalwar et al. | 455/25 |
| 2005/0232183 A1 * | 10/2005 | Sartori et al. | 370/319 |
| 2006/0252367 A1 * | 11/2006 | Haartsen | 455/11.1 |
| 2006/0287828 A1 * | 12/2006 | Lehner | 701/301 |
| 2007/0058577 A1 * | 3/2007 | Rubin | 370/328 |
| 2007/0098009 A1 * | 5/2007 | Du et al. | 370/445 |
| 2007/0109962 A1 * | 5/2007 | Leng et al. | 370/229 |
| 2007/0110005 A1 * | 5/2007 | Jin et al. | 370/335 |
| 2007/0110016 A1 * | 5/2007 | Shen et al. | 370/338 |
| 2007/0280172 A1 * | 12/2007 | Tan et al. | 370/335 |
| 2008/0045139 A1 * | 2/2008 | Chen et al. | 455/3.04 |
| 2008/0107091 A1 * | 5/2008 | Ramachandran | 370/338 |
| 2008/0285500 A1 * | 11/2008 | Zhang et al. | 370/315 |
| 2009/0088164 A1 * | 4/2009 | Shen et al. | 455/436 |
| 2009/0088165 A1 * | 4/2009 | Shen et al. | 455/436 |
| 2009/0097434 A1 * | 4/2009 | Leng et al. | 370/315 |
| 2009/0116423 A1 * | 5/2009 | Ni et al. | 370/315 |
| 2009/0305697 A1 * | 12/2009 | Karabinis et al. | 455/427 |
| 2010/0015914 A1 * | 1/2010 | Li et al. | 455/7 |
| 2010/0074117 A1 * | 3/2010 | Du et al. | 370/241 |
| 2010/0105366 A1 * | 4/2010 | Zhao et al. | 455/414.1 |
| 2010/0227620 A1 * | 9/2010 | Naden et al. | 455/445 |
| 2011/0274032 A1 * | 11/2011 | Leng et al. | 370/315 |
| 2011/0292866 A1 * | 12/2011 | Zheng et al. | 370/315 |
| 2012/0108253 A1 * | 5/2012 | Mao et al. | 455/450 |
| 2012/0207049 A1 * | 8/2012 | Du et al. | 370/252 |

FOREIGN PATENT DOCUMENTS

| | | |
|---|---|---|
| RU | 12898 | 2/2000 |
| RU | 2005121147 A | 1/2006 |
| WO | 2004/045125 A1 | 5/2004 |

OTHER PUBLICATIONS

Asa M et al: "Recommendations for the Scope and Purpose of the Mobile Multihop Relay Task Group. IEEE 802.16mmr-05/032".

IEEE Std 802.16-2004 (Revision of IEEE Std 802.16-2001) "IEEE Standard 802.16; IEEE Standard for Local and metropolitan area networks; Part 16: Air Interface for Fixed Broadband Wireless Access Systems" IEEE Computer Society and the IEEE Microwave Theory and Techniques Society; Sponsored by the LAN/MAN Standards Committee; Oct. 1, 2004; IEEE; 3 Park Avenue, New York; NY 10016-5997, USA; pp. 1-893.

IEEE Std 802.16e-2005 and IEEE Std 802.16-2004/Cor1-2005 (Amendment and Corrigendum to IEEE Std 802.16-2004) "IEEE 802.16e; IEEE Standard for Local and metropolitan area networks; Part 16: Air Interface for Fixed and Mobile Broadband Wireless Access Systems; Amendment 2: Physical and Medium Access Control Layers for Combined Fixed and Mobile Operation in Licensed Bands and Corrigendum 1" IEEE Computer Society and the IEEE Microwave Theory and Techniques Society; Sponsored by the LAN/MAN Standards Committee; IEEE; 3 Park Avenue, New York; NY 10016-5997, USA; pp. 1-864.

* cited by examiner

METHOD, SYSTEM, RELAY STATION AND BASE STATION FOR TRANSMITTING DATA MOBILE COMMUNICATION

CROSS REFERENCE TO RELATED APPLICATIONS

This application is based on and hereby claims priority to PCT Application No. PCT/EP2008/051150 filed on Jan. 30, 2008 and CN Application No. 200710063175.7 filed on Jan. 30, 2007, the contents of which are hereby incorporated by reference.

BACKGROUND OF THE INVENTION

It has become a hot topic of wireless cellular communication to integrate multi-hop capability by deploying relay stations (RS). For example, IEEE has established recently a relay workgroup in order to introduce RS into systems based on IEEE 802.16.

Currently, it is widely accepted that deploying RSs in wireless cellular systems can broaden coverage range, enhance the capacity of a cell, reduce the transmission power at the user station/mobile station (SS/MS) side, and prevent serious shielding. A feasible scheme is to organize a cellular system under the control of a base station (BS), in which all activities in the cell are under the common control of the BS, the BS sends signals to all SS/MSs and is responsible for answering the signaling requests from the SS/MSs.

However, the mode for transmitting signaling in current RSs is simplex; therefore, it is difficult to adjust a relay scheme according to practical conditions.

SUMMARY

The inventors propose a method for transmitting data in mobile communication, in which when transmitting uplink signaling or downlink signaling, an RS can be switched among different operating modes so as to achieve flexible relay schemes.

The inventors also propose a system for transmitting data in mobile communication, in which flexible relay schemes are achieved by switching an RS between different operating modes for transmitting signaling.

The inventors further propose an RS for transmitting data in mobile communication, which switches between different operating modes for transmitting signaling so as to adapt to different network environments or conditions.

The inventors further propose a BS for transmitting data in mobile communication, which controls the RS so as to switch between different operating modes for transmitting signaling so as to adapt to different network environments or conditions.

One or more of these objects may be achieved by the following technical scheme:

a method for transmitting data in mobile communication, being applied in a cell having one base station and more than one relay station; wherein under the control of the base station, the relay stations switch between at least two operating modes when transmitting an uplink signaling or a downlink signaling.

On the one hand, during the transmission of the downlink signaling, the relay stations switch between an operating mode of not participating in the transmission of the downlink signaling and an operating mode of jointly transmitting the downlink signaling with the base station.

Wherein when the base station detects a coverage blind-spot in the cell, after having negotiated with the relay station close to the coverage blind-spot in the cell, it instructs the relay station to switch from the operating mode of not participating in the transmission of the downlink signaling into the operating mode of jointly transmitting the downlink signaling with the base station.

Wherein the situation in which the base station detects the occurrence of the coverage blind-spot in the cell can be confirmed according to the following process:

the base station detects that a difference between an initial ranging parameter of more than one user station/mobile station and a measurement parameter reported by the relay stations is larger than a preset difference threshold.

Wherein when the relay station detects a coverage blind-spot in the cell, after having negotiated with the base station, it switches from the operating mode of not participating in the transmission of the downlink signaling into the operating mode of jointly transmitting the downlink signaling with the base station.

Wherein the situation in which the relay station detects the occurrence of the coverage blind-spot in the cell is confirmed according to the following process:

the relay station detects during its idle time slot that more than one user station/mobile station is attempting to connect to a radio access point of another cell, but the signal quality from the user stations/mobile stations received by the relay station is above a preset signal quality threshold.

Wherein when the base station confirms that the coverage blind-spot in the cell has been eliminated, after having negotiated with the relay station that transmits the downlink signaling jointly with the base station in the cell, it instructs the relay station to switch back to the operating mode of not participating in the transmission of the downlink signaling.

Wherein the steps for the base station to confirm, by long-term learning, the elimination of the coverage blind-spot in the cell comprise:

the base station reducing step by step the signaling transmitting power of the relay station that transmits the downlink signaling jointly with the base station in the cell and observes the responses from the user stations/mobile stations, and if after the transmitting power has been reduced to a normal transmission power, the user stations/mobile stations are still capable of receiving normally, then the base station determines that the coverage blind-spot in the cell has been eliminated.

Wherein when a network confirms that the wireless resource of a cell is currently sufficient and that of an adjacent cell is insufficient, by instructing the base station in the cell to negotiate with the relay station in the cell close to the adjacent cell, it makes the relay station switch from the operating mode of not participating in the transmission of the downlink signaling into the operating mode of jointly transmitting the downlink signaling with the base station; or when the network confirms that the wireless resource of a cell is currently insufficient and that of an adjacent cell is sufficient, by instructing the base station in the cell to negotiate with the relay station in the cell close to the adjacent cell, it makes the relay station switch from the operating mode of jointly transmitting the downlink signaling with the base station into the operating mode of not participating in the transmission of the downlink signaling.

Wherein when the relay station is in the operating mode of jointly transmitting the downlink signaling with the base station, the relay station receives a downlink signaling pre-transmitted by the base station before a transmission time; and at the transmission time, the relay station and the base station transmit the downlink signaling to the user stations/mobile stations simultaneously.

Wherein during the transmission of the downlink signaling, the relay station can switch between three operating modes of not participating in the transmission of the downlink signaling, jointly transmitting the downlink signaling with the base station, and jointly transmitting a preamble code with the base station.

Wherein when the network confirms that the wireless resource of an adjacent cell of one cell is insufficient, by instructing the base station in the cell to negotiate with the relay station in the cell close to the adjacent cell, it can make the relay station switch from the operating mode of not participating in the transmission of the downlink signaling into the operating mode of jointly transmitting the preamble code with the base station; or when the network confirms that the wireless resource of an adjacent cell of one cell is sufficient, by instructing the base station in the cell to negotiate with the relay station in the cell close to the adjacent cell, it can make the relay station switch from the operating mode of jointly transmitting the preamble code with the base station into the operating mode of not participating in the transmission of the downlink signaling.

Wherein, when the base station detects that a coverage blind-spot appears in the cell, after having negotiated with the relay station close to the coverage blind-spot, it can instruct the relay station to switch from the operating mode of jointly transmitting the preamble code with the base station into the operating mode of jointly transmitting the downlink signaling with the base station; or when the base station confirms that the coverage blind-spot in the cell has been eliminated, after having negotiated with the relay station in the cell that jointly transmits the downlink signaling with the base station, it can instruct the relay station to switch from the operating mode of jointly transmitting the downlink signaling with the base station into the operating mode of jointly transmitting the preamble code with the base station.

On the other hand, when transmitting uplink signaling, the process for the relay station to switch between at least two operating modes can comprise:

the relay station switching between an operating mode of transmitting the whole uplink signaling after having performed digital baseband processing on it, and an operating mode of transmitting delay-sensitive uplink signaling after having stored it and transmitting delay-insensitive uplink signaling after having performed digital baseband processing on it.

Wherein when the base station makes a judgement that the current time-delay requirement is relatively high, after having negotiated with the relay station, it instructs the relay station to switch from the operating mode of transmitting the whole uplink signaling after having performed digital baseband processing on it into the operating mode of transmitting delay-sensitive uplink signaling after having stored it and transmitting delay-insensitive uplink signaling after having performed digital baseband processing on it; or when the base station makes a judgement that the current time-delay requirement is relatively low or a requirement for transmission quality is relatively high, after having negotiated with the relay station, it instructs the relay station to switch from the operating mode of transmitting delay-sensitive uplink signaling after having stored it and transmitting delay-insensitive uplink signaling after having performed digital baseband processing on it into the operating mode of transmitting the whole uplink signaling after having performed digital baseband processing on it.

Wherein when the relay station is in the operating mode of transmitting delay-sensitive uplink signaling after having stored it, the relay station can receive information about an uplink signaling gap and an amplified gap preset by the base station for transmitting a delay-sensitive signaling on an uplink subframe; and the relay station receives the delay-sensitive uplink signaling within the uplink signaling gap, and transmits the delay-sensitive uplink signaling within the amplified gap.

Wherein the process for the base station to pre-set the amplified gap can comprise:

the base station dividing the more than one relay stations in the cell into groups, and reserving a different amplified gap in the uplink subframe for the relay stations in each group; and the relay stations transmitting the received delay-sensitive signaling within their respective amplified gaps.

Wherein the process for the base station to pre-set the amplified gap can comprise:

the base station assigning N different amplified gaps for M relay stations in the cell, reserving one or several of the N amplified gaps for each of the relay stations, wherein M is a positive integer, and N is an integer; and the relay station transmitting the received delay-sensitive signaling within the one or several of the N amplified gaps reserved for it by the base station.

Wherein the relay station extracts the uplink signaling gap and the amplified gap from an information unit in a received downlink mapping signaling DL-MAP of the base station.

Wherein the delay-sensitive uplink signaling can comprise a channel quality indicator channel (CQICH) of a physical layer (PHY), an acknowledgement channel (ACKCH), and an uplink signaling transmitted in a CDMA ranging field, or any combination thereof.

Wherein the delay-sensitive uplink signaling can occupy one or several continuous time slots in the uplink subframe.

Wherein during the transmission of the uplink signaling, the relay station can switch between an operating mode of transmitting the whole uplink signaling after having performed digital baseband processing on it, an operating mode of transmitting delay-sensitive uplink signaling after having stored it and transmitting delay-insensitive uplink signaling after having performed digital baseband processing on it, and an operating mode of transmitting the whole uplink signaling after having stored it.

Wherein, when the relay station is in the operating mode of transmitting the whole uplink signaling after having performed digital baseband processing on it, if the base station makes a judgement that a current time-delay requirement is increased to a first time-delay threshold, by negotiating with the relay station, the base station instructs the relay station to switch to the operating mode of transmitting the whole uplink signaling after having stored it; if the base station makes a judgement that the current time-delay requirement is increased to a second time-delay threshold, by negotiating with the relay station, the base station instructs the relay station to switch to the operating mode of transmitting delay-sensitive uplink signaling after having stored it and transmitting delay-insensitive uplink signaling after having performed digital baseband processing on it;

when the relay station is in the operating mode of transmitting delay-sensitive uplink signaling after having stored it and transmitting delay-insensitive uplink signaling after having performed digital baseband processing on it, if the base station makes a judgement that the current time-delay requirement is increased to the first time-delay threshold, by negotiating with the relay station, the base station instructs the relay station to switch to the operating mode of transmitting the whole uplink signaling after having stored it; if the base station makes a judgement that the current time-delay requirement is reduced to below the second time-delay threshold or a quality requirement is increased to a first quality threshold, by negotiating with the relay station, the base station instructs the relay station to switch into the operating mode of transmitting the whole uplink signaling after having performed digital baseband processing on it;

when the relay station is in the operating mode of transmitting the whole uplink signaling after having stored it, if the base station makes a judgement that the current time-delay requirement is reduced to below the first time-delay threshold, by negotiating with the relay station, the base station instructs the relay station to switch into the operating mode of transmitting delay-sensitive uplink signaling after having stored it and transmitting delay-insensitive uplink signaling after having performed digital baseband processing on it; if the base station makes a judgement that the current time-delay requirement is reduced to below the second time-delay threshold or the quality requirement is raised to the first quality threshold, by negotiating with the relay station, the base station instructs the relay station to switch to the operating mode of transmitting the whole uplink signaling after having performed digital baseband processing on it; and the time-delay requirement corresponding to the first time-delay threshold is higher than the time-delay requirement corresponding to the second time-delay threshold.

The method can also comprise:

the relay station performing an initial negotiation with the base station when it is initiated and reporting all operating modes it supports for signaling transmission; and the base station designating an initial operating mode for the relay station, and controlling the relay station to operate in the designated initial operating mode.

The method can further comprise:

the relay station reporting to the base station when it detects that a wired connection is established between itself and a backbone network; and after the base station has decided to make use of the wired connection between the relay station and the backbone network, it instructs the relay station to forward data via the wired connection between the relay station and the backbone network.

Wherein, when the relay station detects the existence of the wired connection between itself and the backbone network, it can initially negotiate with the base station, and reports the existence of the wired connection between itself and the backbone network.

Wherein the base station can decide whether or not to use the wired connection according to the load in the cell and/or the quality of the wired connection;

if the load in the cell is relatively small and/or the quality of the wired connection is relatively poor, it decides not to use the wired connection; and if the load in the cell is relatively large and/or the quality of the wired connection is relatively good, it decides to use the wired connection.

Wherein the relay station forwards business data and signaling via the wired connection between itself and the backbone network according to QoS requirements.

Wherein when the relay station forwards data through the wired connection between itself and the backbone network, wireless connections for the relay station to communicate with user stations/mobile stations in the cell and wireless connections for the relay station to communicate with the base station when necessary are both controlled by the base station.

According to another aspect, the inventors propose a system for transmitting data in mobile communication, the mobile communication process involving more than one cell, and the cells comprising one base station and more than one relay station, wherein under the control of the base station, the relay stations switch between at least two operating modes when transmitting an uplink signaling or a downlink signaling.

On the one hand, when transmitting downlink signaling, the relay stations can switch between an operating mode of not participating in the transmission of the downlink signaling and an operating mode of jointly transmitting the downlink signaling with the base station.

Or, the relay stations can switch among three operating modes of not participating in the transmission of the downlink signaling, jointly transmitting the downlink signaling with the base station, and jointly transmitting a preamble code with the base station.

On the other hand, when transmitting uplink signaling, the relay stations switch between an operating mode of transmitting the whole uplink signaling after having performed digital baseband processing on it, and an operating mode of transmitting delay-sensitive uplink signaling after having stored it and transmitting delay-insensitive uplink signaling after having performed digital baseband processing on it.

Or, the relay stations switch between three operating modes of transmitting the whole uplink signaling after having performed digital baseband processing on it, of transmitting delay-sensitive uplink signaling after having stored it and transmitting delay-insensitive uplink signaling after having performed digital baseband processing to it, and of transmitting the whole uplink signaling after having stored it.

In addition, the inventors also disclose a relay station positioned in a cell of a wireless cellular network for transmitting data in mobile communication, comprising an RF transceiving and processing unit, and also comprising a negotiating unit and a control unit;

the negotiating unit sends an operating mode switching instruction to the control unit after having negotiated with a base station in the cell; and the control unit controls the RF transceiving and processing unit so as to switch between at least two operating modes for transmitting signaling according to the mode switching instruction sent from the negotiating unit.

Wherein the operating modes of the signaling transmission can comprise a downlink operating mode I of not participating in the transmission of a downlink signaling and a downlink operating mode II of transmitting jointly with the base station; and the control unit can comprise:

a downlink mode controller for instructing the RF transceiving and processing unit to stop transmitting the downlink signaling, after the negotiating unit has sent it an instruction to switch the operating mode into the downlink operating mode I; and for instructing the RF transceiving and processing unit to receive a downlink signaling pre-transmitted from the base station before a transmission time and to transmit the downlink signaling to a user station/mobile station jointly with the base station at the transmission time after the negotiating unit has sent it an instruction to switch the operating mode into the downlink operating mode II.

Wherein, the RF transceiving and processing unit comprises an RF receiver, an RF transmitter, and a baseband processing module; and in the operating mode II for transmitting the downlink signaling, the RF receiver receives a pre-transmission of the downlink signaling transmitted from the base station before the transmission time, the baseband processing module performs digital baseband processing on the downlink signaling, and the RF transmitter transmits the downlink signaling jointly with the base station at the transmission time.

Wherein the signaling transmission of the operating modes can comprise a downlink operating mode I of not participating in the transmission of a downlink signaling, a downlink operating mode II of jointly transmitting with the base station, and a downlink operating mode III of transmitting a preamble code jointly with the base station; and the control unit comprises:

a downlink mode controller, for instructing the RF transceiving and processing unit to stop transmitting the downlink signaling after the negotiating unit has sent it an instruction to switch the operating mode into the downlink operating mode I; for instructing the RF transceiving and processing unit to receive a downlink signaling pre-transmitted from the base station before a transmission time and to transmit the downlink signaling to a user station/mobile station jointly with the base station at the transmission time after the negotiating unit has sent it an instruction to switch the operating mode into the downlink operating mode II; and for instructing the RF transceiving and processing unit to transmit the preamble code to the user station/mobile station jointly with the base station at the transmission time after the negotiating unit has sent it an instruction to switch the operating mode into the downlink operating mode III.

The relay station can also comprise:

a monitoring unit, for reporting to the base station and instructing the negotiating unit to negotiate with the base station when it detects a coverage blind-spot in the cell.

Wherein the operating modes of the signaling transmission comprise an uplink operating mode I of transmitting the whole uplink signaling after having performed digital baseband processing on it, and an uplink operating mode II for the relay station to transmit delay-sensitive uplink signaling after having stored it and to transmit delay-insensitive uplink signaling after having performed the digital baseband processing on it; and the control unit can comprise:

an uplink mode controller, for instructing the RF transceiving and processing unit to transmit the whole uplink signaling after having performed the digital baseband processing on it after the negotiating unit has sent it an instruction to switch to the uplink operating mode I; and for instructing the RF transceiving and processing unit, after the negotiating unit has sent it an instruction to switch to the uplink operating mode II, to receive the delay-sensitive uplink signaling at an uplink signaling gap set by the base station, to transmit the delay-sensitive uplink signaling at an amplified gap reserved by the base station for the relay station after having stored it, and to receive the delay-insensitive uplink signaling, and transmit the delay-insensitive uplink signaling after having performed the digital baseband processing on it.

Wherein the RF transceiving and processing unit comprises an RF receiver, an RF transmitter, a storage module, and a baseband processing module;

in the uplink operating mode I, the RF receiver receives the uplink signaling, the baseband processing module performs digital baseband processing on the whole uplink signaling, and the RF transmitter transmits the whole uplink signaling; and in the uplink operating mode II, the RF receiver receives the delay-sensitive uplink signaling within the uplink signaling gap set by the base station, the storage module stores the delay-sensitive uplink signaling, the RF transmitter transmits the delay-sensitive uplink signaling within the amplified gap reserved by the base station; the RF receiver receives the delay-insensitive uplink signaling, the baseband processing module performs the digital baseband processing on the delay-insensitive uplink signaling, and the RF transmitter transmits the delay-insensitive uplink signaling.

Wherein, the RF transceiving and processing unit can further comprise:

a first switch having a first port and a second port, wherein when the first port is opened, an output terminal of the storage module is connected to an input terminal of the RF emitter, and when the second port is opened, an output terminal of the baseband processing module is connected to the input terminal of the RF emitter;

a second switch having a first port and a second port, wherein when the first port is opened, the RF receiver is connected to an antenna, and when the second port is opened, the RF emitter is connected to the antenna;

in the uplink operating mode I, the first switch only opens the second port, and the whole uplink signaling is transmitted by the RF transmitter after having performed the digital baseband processing by the baseband processing module;

in the uplink operating mode II, within the uplink signaling gap, the second switch only opens the first port, and after the storage module has stored the delay-sensitive uplink signaling received by the RF transceiver, the storage module stores the delay-sensitive uplink signaling; within the amplified gap, the first switch only opens the first port and the second switch only opens the second port, the RF emitter fetches the delay-sensitive uplink signaling from the storage module and transmits it; within other uplink subframe gaps, the second switch opens the first port and the first switch opens the second port, the RF receiver receives the delay-insensitive uplink signaling, the baseband processing module outputs the delay-insensitive uplink signaling to the RF transmitter after having performed the digital baseband processing on it, the second switch opens the second port, and the RF transmitter transmits the delay-insensitive uplink signaling.

Wherein the negotiating unit is also used to conduct an initial negotiation with the base station when the relay station is initiated, to report its supported operating modes for signaling transmission, and to inform the control unit after having received an instruction on the initial operating mode returned from the base station.

Wherein the operating modes of the signaling transmission can also comprise an uplink operating mode I of transmitting the whole uplink signaling after having performed digital baseband processing on it, an uplink operating mode II of transmitting the delay-sensitive uplink signaling after having stored it and transmitting the delay-insensitive uplink signaling after having performed the digital baseband processing on it, and an uplink operating mode III of transmitting the whole uplink signaling after having stored it; and the control unit comprises:

an uplink mode controller, for instructing the RF transceiving and processing unit, after the negotiating unit has sent it an instruction to switch to the uplink operating mode I, to transmit the whole uplink signaling after having performed the digital baseband processing to it; for instructing the RF transceiving and processing unit, after the negotiating unit has sent it an instruction to switch to the uplink operating mode II, to receive the delay-sensitive uplink signaling within an uplink signaling gap set by the base station, after having stored the delay-sensitive uplink signaling to transmit the same within an amplified gap reserved by the base station for the relay station, to receive the delay-insensitive uplink signaling and to transmit it after having performed the digital baseband processing; and for instructing the RF transceiving and processing unit, after the negotiating unit sends it an instruction to switch to the uplink operating mode III, to store and then transmit the whole uplink signaling.

The relay station further comprises an interface unit, wherein the negotiating unit is also used to report to the base station that a wired connection exists between the relay station and a backbone network when the relay station is initiated, and to inform the control unit after having received an instruction returned from the base station about whether or not to use the wired connection; and the control unit comprises a wired connection controller for controlling the interface unit so as to forward data by using the wired connection, after having received an instruction returned from the base station to use the wired connection.

According to yet another aspect, the inventors further propose a base station for transmitting data in mobile communication, positioned in a cell of a multi-hop wireless cellular network, comprising an RF transceiving and processing unit, wherein it further comprises a negotiating unit and a control unit;

the negotiating unit sends an instruction to switch operating mode to the relay station and the control unit after having negotiated with a relay station in the cell; and the control unit controls the relay station so as to switch between at least two operating modes of signaling transmission via the RF transceiving and processing unit according to the instruction to switch operating mode sent from the negotiating unit.

Wherein, the control unit can comprise:

a pre-transferring module, for instructing the RF transceiving and processing unit to send a downlink signaling to be transmitted to the relay station being in the operating mode of jointly transmitting downlink signaling with the base station before a transmission time.

The base station also comprises:

a monitoring unit, for reporting to the network when it detects a coverage blind-spot in the cell, or when it receives a report from the relay station that a coverage blind-spot appears in the cell, and at the same time instructing the negotiating unit to negotiate with the relay station.

Wherein the control unit can comprise:

an uplink allocation module, for determining an uplink signaling gap in which the delay-sensitive uplink signaling is located in an uplink subframe; for reserving an amplified gap for transmitting the delay-sensitive uplink signaling for the relay station in the operating mode of transmitting delay-sensitive uplink signaling after having stored it and transmitting delay-insensitive uplink signaling after having performed digital baseband processing on it; and then informing the relay station of the determined uplink signaling gap and the amplified gap via the RF transceiving and processing unit.

Wherein the negotiating unit is also used to select an operating mode and then inform the relay station of it after having received a report about the operating modes it supports sent from the relay station when it is initiated.

Wherein the negotiating unit is also used to decide, after having received a report from the relay station when it is initiated that a wired connection exists between the relay station and a backbone network, whether or not to use the wired connection and then inform the relay station.

It can be seen from the above technical solution that, when the RS performs the transmission of uplink signaling or downlink signaling, it can switch between different operating modes for transmitting signaling, so as to achieve flexible relay schemes. Since the RS can switch between the two operating modes of not participating in the transmission of downlink signaling and jointly transmitting the downlink signaling with the BS, it is able to meet at the same time the demand of high spectrum-efficiency within a cell and the demand of powerful system coverage, and it is helpful in achieving the load equilibrium between adjacent cells. Since the RS is able to switch between the two operating modes of transmitting the whole uplink signaling after having performed digital baseband processing on it and of transmitting delay-sensitive uplink signaling after having stored it and transmitting delay-insensitive uplink signaling after having performed digital baseband processing on it, delay demands other than uplink signaling can be achieved, and when the delay demand is high, digital baseband processing will not be performed on delay-sensitive uplink signaling so as to reduce the delay to a minimum.

Further, the proposals can also make use of the wired connection between the RS and a backbone network to forward data directly without the need to forward data via the BS, so as to reduce the cell load and to make it possible for the cell to accommodate more SS/MSs under the presupposition of not requiring additional wireless resources.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
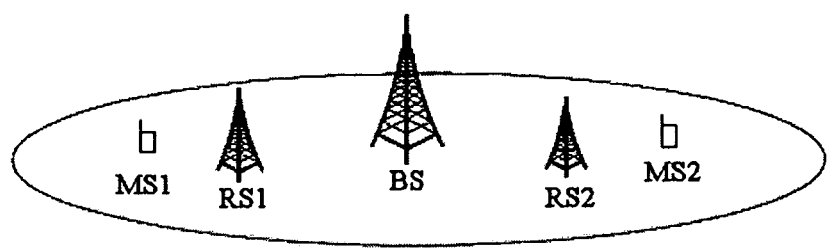
FIG. 1 is a schematic view of the composition of a wireless cellular network.

Reference will now be made in detail to the preferred embodiments of the present invention, examples of which are illustrated in the accompanying drawings, wherein like reference numerals refer to like elements throughout. It needs to be pointed out that the embodiments described here are merely for the purposes of illustrating the proposals; they are not to be understood as limiting the present invention.

A BS and more than one RS are deployed in a cell of a wireless cellular network, in which under the control of the BS the RS switches between different operating modes for transmitting signaling to realized flexible relay schemes. FIG. 1 is a schematic view of the composition of a wireless cellular network. It can be seen in FIG. 1 that the cell comprises a BS, an RS1, an RS2, an MS1 and an MS2. Among them one or both of RS1 and RS2 are configured to be able to switch between different operating modes. If there exists in the cell an RS that does not support the switching between different operating modes, it will transmit signaling still in a single operating mode, and the BS can control respectively all the RSs within the cell.

Figure 2A:
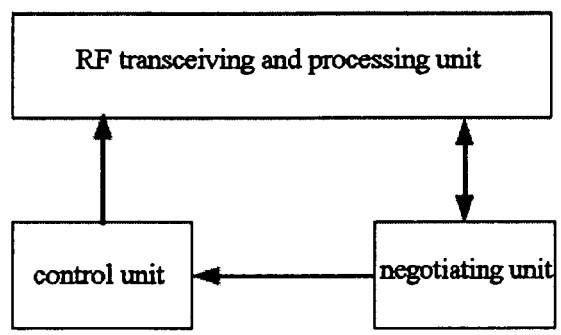
FIG. 2a is a schematic structure view of an RS according to a potential embodiment of the inventors' proposals, for switching between at least two operating modes for transmitting signaling.

FIG. 2*a* illustrates the structure of the proposed RS that switches between at least two operating modes for transmitting signaling. It can be seen in FIG. 2*a* that the RS comprises an RF transceiving and processing unit, a negotiating unit and a control unit.

Wherein the RF transceiving and processing unit performs the basic functions, such as RF receiving, digital baseband processing, RF transmitting, etc.; the negotiating unit sends an instruction to switch operating mode to the control unit after having negotiated with the BS of the cell; and the control unit controls the RF transceiving and processing unit to switch between at least two operating modes for transmitting signaling according to the instruction to switch operating mode sent from the negotiating unit.

Figure 2B:
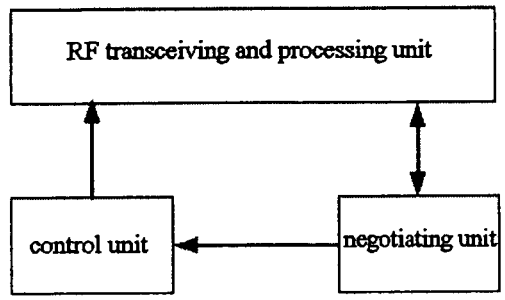
FIG. 2b is a schematic structure view of a BS for controlling the RS to switch between at least two operating modes for transmitting signaling.

FIG. 2*b* illustrates the structure of the proposed BS for controlling the RS to switch between at least two operating modes for transmitting signaling. It can be seen from FIG. 2*b* that the BS comprises an RF transceiving and processing unit, a negotiating unit and a control unit.

Wherein the RF transceiving and processing unit performs the basic functions, such as RF receiving, digital baseband processing, RF transmitting, etc.; the negotiating unit sends an instruction to switch operating mode to the RS and the control unit after having negotiated with the RS of the cell; and the control unit controls the RS to switch between at least two operating modes for transmitting signaling through the RF transceiving and processing unit according to the instruction to switch operating mode sent from the negotiating unit.

The transmitted signaling comprises uplink and downlink signaling, therefore different signaling transmission modes can comprise different modes for transmitting downlink signaling and different modes for transmitting uplink signaling. This will be described in detail hereafter through several embodiments.

First Embodiment

According to the first embodiment, a BS and more than one RS are deployed in a cell, according to the environments and the conditions of the network, and under the control of the BS the RS is able to switch between different operating modes for transmitting downlink signaling, for example between a downlink operating mode I and a downlink operating mode II. In the downlink operating mode I, the RS only forwards data and does not participate in the transmission of downlink signaling, and the whole downlink signaling is uniformly transmitted by the BS; in the downlink operating mode II, the RS not only forwards business data, but also participates in the transmission of the downlink signaling, that is to say, the RS transmits the downlink signaling jointly with the BS. To achieve the object that the RS and the BS jointly transmit the downlink signaling, it is necessary to reserve some of the wireless resources for the BS to pre-transfer to the RS the downlink signaling to be transmitted jointly.

When the RS is in the downlink operating mode I, its signaling consumption is small, but its performance will be relatively poor if there exists a coverage blind-spot around it; when the RS is in the downlink operating mode II, its signaling consumption is large, but its performance is relatively good if there exists a coverage blind-spot around it.

It is described in detail below, when the RS is transmitting downlink signaling, under what circumstances it is necessary for it to switch operating mode.

Figure 3:
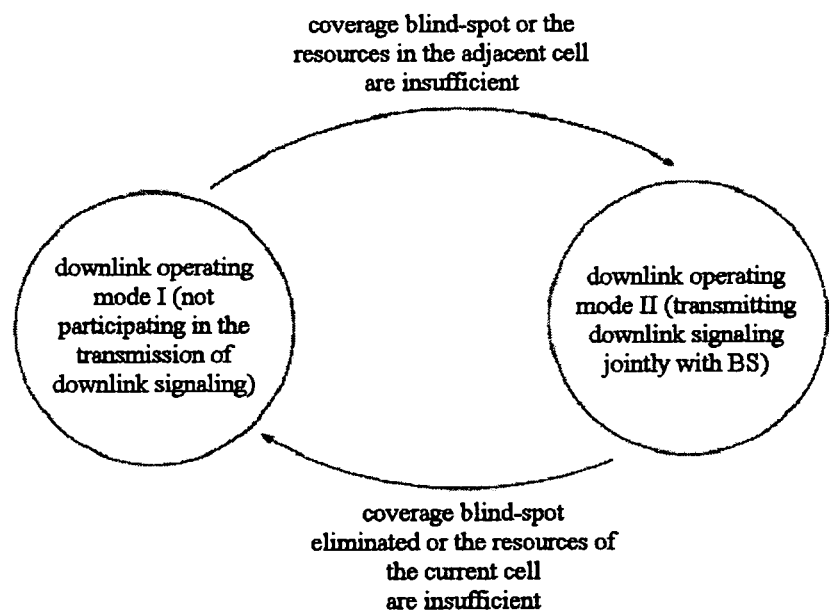
FIG. 3 illustrates the status machine of an RS switching between two downlink operating modes for transmitting downlink signaling.

FIG. 3 illustrates the status machine of the RS switching between downlink operating modes for transmitting downlink signaling. It can be seen in FIG. 3 that, when a coverage blind-spot appears in the current cell or the wireless resources of adjacent cell are insufficient, so it needs to attract more SS/MSs into the current cell, the switch from the downlink operating mode I to mode II is triggered; and when the coverage blind-spot is eliminated or the wireless resources of the current cell are insufficient, the switch from the downlink operating mode II to the downlink operating mode I is triggered.

As described above, the RS is triggered to switch from the downlink operating mode I to the downlink operating mode II when the coverage problem appears in the cell, and this coverage problem can be detected either by the RS or by the BS.

Switching triggered by an RS detection: the RS can monitor, by making use of an idle time slot, the communication status of a radio access point (RAP) connecting the SS/MSs to other cells. When the RS find that some SS/MSs are always trying to connect to the RAP of other cells, but the quality of the signals received by the RS and sent from these SS/MSs is relatively high, for example higher than a preset threshold of signal quality, in other words, these SS/MSs will be able to obtain service of better quality if they were connected to the cell to which the RS belongs, the RS reports to the network through the BS at this time and prepares to execute the switching from the downlink operating mode I to the downlink operating mode II.

Switching triggered by a BS detection: when the BS finds out that the parameters of an initial ranging measurement being performed by some SS/MSs are significantly different from the measurement results reported by the RS, for example, an SS/MS is making its initial measurement of the distance from it to the BS by using its maximum power, but this SS/MS is close to an RS, the BS will report to the network if the difference is greater than a preset difference threshold, and at the same time it negotiates with the RS so as to switch the downlink operating mode of the RS.

It should be noted that, detections conducted by the RS and the BS have their own advantages, the advantage of the detection by the RS lies in that it can discover the coverage worsening within the region covered originally by several RAPs, while the advantage of the detection by the BS lies in that it can discover the coverage problem within the region covered previously by one RAP.

Contrary to it, when the coverage blind-spot disappears, the RS is triggered to switch from the downlink operating mode II to the downlink operating mode I. For example, when it is concluded by long-term learning that the RS is safe enough in the downlink operating mode I, the RS is triggered to switch from the downlink operating mode II into the downlink operating mode I so as to reduce the consumption of the signaling and the occupation of the resources. The practical way to realize this can be: reducing step by step the transmitting power of downlink control signaling and observing the responses from the SS/MSs, if during a relatively long time span all SS/MSs are able to receive and recognize the downlink control signaling transmitted by the RS in a normal transmitting power, then it can be concluded that the downlink operating mode I is safe enough to the RS.

Moreover, as described above, when it is necessary to achieve load equilibrium between adjacent cells, the RS can also be triggered to switch between the downlink operating mode I and the downlink operating mode II. For example, if the wireless resources of a cell B are insufficient while that of its adjacent cell A are still sufficient, it is usually considered to attract more SS/MSs into the cell A, and at this time, the RS in the cell A, which is close to the cell B, can be triggered to switch from the downlink operating mode I into the downlink operating mode II; whereas, when the wireless resources of the cell A are insufficient and that of its adjacent cell B are in surplus, the RS in the cell A, which is in the downlink operating mode II, can be triggered to switched into the downlink operating mode I so as to avoid overloading the cell B.

Figure 4:
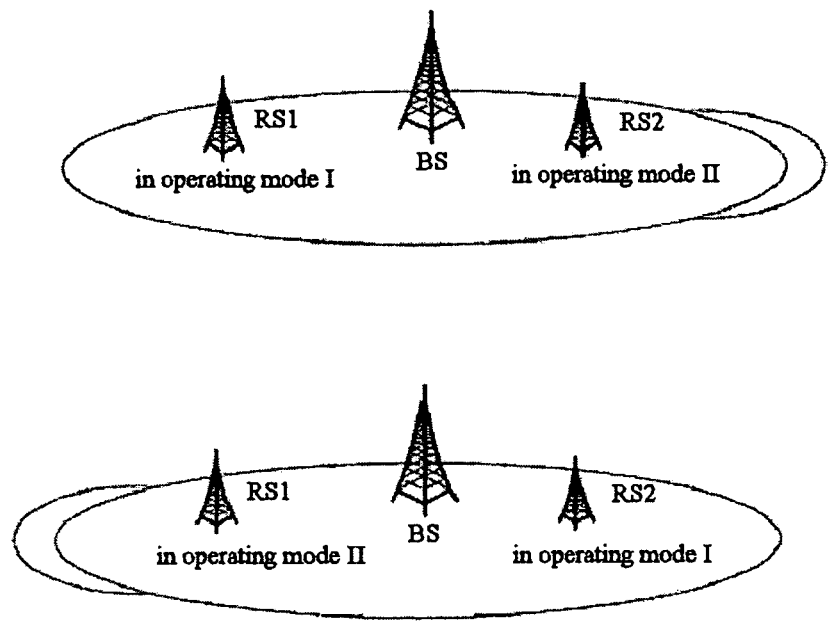
FIG. 4 is a schematic view showing the load equilibrium between cells by switching the RS between two downlink operating modes.

In addition, in some cases, it is necessary for the network to regulate the cells' covering area irregularly, so that the regulation by switching the downlink operating modes of RS can meet the requirement of more precise load equilibrium. As shown in FIG. 4, a cell comprises two RSs: RS1 and RS2, at the upper part of FIG. 4, RS1 is in the downlink operating mode I, and RS2 is in the downlink operating mode II, if here the network wishes that the cell attract more SS/MSs from a cell to its left and at the same time a cell to its right attract more SS/MSs from this cell, then it is possible to instruct the two RSs to switch their downlink operating modes. The real covering area of the cell after the network having instructed these two RSs to switch their downlink operating modes is shown in the lower part of FIG. 4; it can be seen there, that the mode switching of the RSs results in irregular change of covering area, the covering area to the right of the cell becomes smaller and that to the left of the cell becomes larger.

Furthermore, when initiated, the RS can have an initial negotiation with the BS to report the two downlink operating modes it supports for transmitting downlink signaling; the BS confirms the downlink operating mode of the RS and controls the RS to operate in the determined downlink operating mode.

Hereinbelow, the switching of an RS between two downlink operating modes and the structure of a BS for controlling the RS to switch between two downlink operating modes is explained.

Figure 5A:
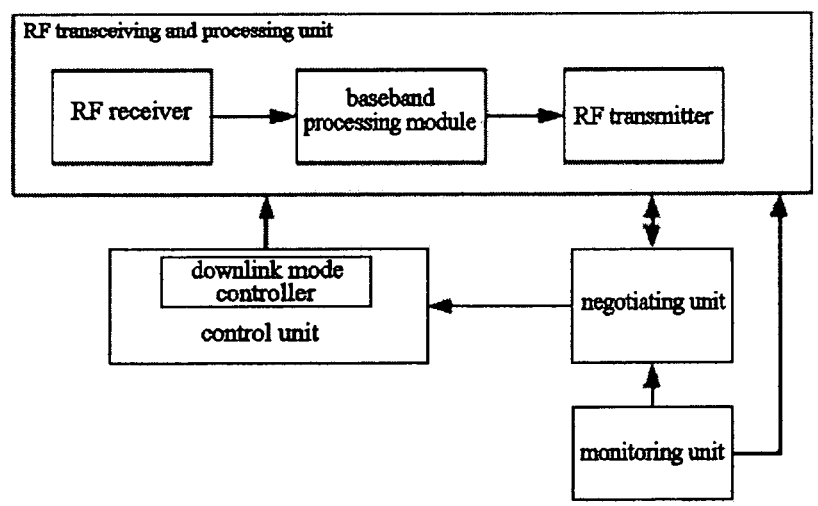
FIG. 5a is a schematic structure view of an RS switching between two downlink operating modes according to a first embodiment.

FIG. 5a is a schematic structure view of an RS switching between two downlink operating modes according to a first embodiment. As shown in FIG. 5a, in this embodiment, the RS capable of switching between the two downlink operating modes comprises an RF transceiving and processing unit, a negotiating unit, a control unit and a monitoring unit.

Wherein, the RF transceiving and processing unit comprises:

an RF receiver for inputting the RF signals received by an antenna into a baseband processing module;

a baseband processing module for sending the RF signals to an RF transmitter after having performed digital baseband processing thereto;

an RF transmitter for transmitting via the antenna the signals sent from the baseband processing unit.

The monitoring unit determines by monitoring the status of a cell whether it is necessary to trigger the RS to switch its downlink operating mode, and when a judgment is made that it is necessary to trigger the RS to switch the downlink operating mode, it reports via a BS to the network its monitoring results, and instructs the negotiating unit to negotiate with the BS; for example, it monitors the communication status of the connection between the SS/MSs and the radio access points (RAPs) of other cells during idle time slots, wherein the RAPs comprise BSs and RSs, if it is found that some SS/MSs are trying to connect to an RAP of another cell and the quality of the received signals is relatively high, it indicates that these SS/MSs are close to the RS, then the downlink operating mode can be switched.

The negotiating unit, under the instruction of the monitoring unit, negotiates with the BS about the switching of downlink operating mode, and after having received the instruction to switch the operating mode, it informs the control unit that the downlink operating mode needs to be switched. Preferably, the negotiating unit is also used to have the initial negotiation with the BS when it is initiated, to report the operating modes it supports for transmitting downlink signaling, and after having received the instruction on the initial operating mode returned from the BS, to instruct the control unit to perform a corresponding operation.

The control unit comprises a downlink mode controller, which, after having received the instruction to switch the operating mode from the negotiating unit, sends a control signal to the RF transceiving and processing unit; after the negotiating unit having sent it the instruction to switch the operating mode to the downlink operating mode I, it instructs the RF transceiving and processing unit to stop transmitting downlink signaling; and after the negotiating unit having sent it the instruction to switch the operating mode to the downlink operating mode II, it instructs the RF transceiving and processing unit to receive the downlink signaling pre-transferred from the BS before the transmission time, and to transmit the downlink signaling simultaneously with the BS during the transmission time.

Figure 5B:
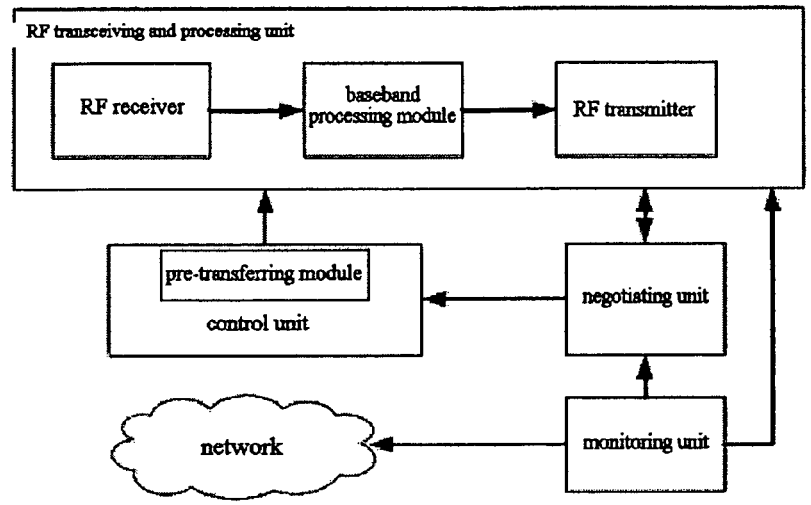
FIG. 5b is a schematic structure view of a BS for controlling an RS to switch between two operating modes according to the first embodiment.

FIG. 5b is a schematic structure view of a BS for controlling an RS to switch between two operating modes according to the first embodiment. As shown in FIG. 5b, in this embodiment, the BS for controlling the RS to switch between two downlink operating modes comprises an RF transceiving and processing unit, a negotiating unit, a control unit and a monitoring unit.

Wherein, the RF transceiving and processing unit comprises an RF receiver, a baseband processing module and an RF transmitter; wherein:

the RF receiver is for inputting the RF signals received by an antenna into the baseband processing module;

the baseband processing module is for sending the RF signals to an RF transmitter after having performed digital baseband processing thereto; and the RF transmitter is for transmitting via the antenna the signals sent from the baseband processing unit.

When receiving the monitoring results from the RS for reporting to the network, the monitoring unit sends the monitoring results reported from the RS to the network through the wired connection between it and the network; when discovering that the parameters initial ranging by the SS/MS are significantly different from the measurement results reported from the RS, it sends the measurement results to the network via the wired connection, and instructs the negotiating unit to negotiate with a corresponding RS about the switching of its downlink operating mode.

The negotiating unit negotiates with the corresponding RS about the switching of its downlink operating mode through the RS transceiving and processing unit, and after the completion of the negotiation or having received the instruction to switch from the network, it sends the instruction to switch the operating mode to the RS, and sends the instruction to switch the operating mode to the control unit so as to instruct the control unit to execute a corresponding operation. Preferably, the negotiating unit is also used to select an initial operating mode after having received from the RS the operating modes it supports for transmitting downlink signaling reported when it is initiated, and to inform the RS.

According to the instruction to switch the operating mode sent from the negotiating unit, the control unit controls via the RF transceiving and processing unit the switching of the RS between the downlink operating modes.

The control unit can comprise a pre-transferring module, for pre-sending downlink signaling to the RS in the downlink operating mode II. For example, if it is prescribed to send downlink signaling to the SS/MS within the nth time slot (i.e. the transmission time), then the downlink signaling is presented to the RS in the downlink operating mode II within the (n−1)th time slot, so that the RS in the downlink operating mode II can transmit the downlink signaling simultaneously with the BS to the SS/MS within the nth time slot (i.e. the transmission time).

Based on the RS and BS described above, at the stage of network planning, the downlink operating modes of the RSs in a cell can be configured one by one according to the coverage conditions. As described above, an RS can switch between two downlink operating modes, in order to improve spectrum efficiency, if there is no explicit coverage blind-spot within the cell, all RSs may as well be in the downlink operating mode I because the RS in the downlink operating mode I occupies nearly no wireless resources. If there exists an explicit coverage blind-spot in the cell, one RS is needed to be in the downlink operating mode II and this RS may as well be the one closest to the coverage blind-spot. The coverage blind-spot can be located through various approaches. Thus, different RSs within one cell may be in different operating modes.

When the network is established, whether to trigger a corresponding RS to switch its operating mode is determined according to practical network monitoring results or requirements, and when it is necessary to trigger, the operating mode of the RS is switched.

As described above, if an RS detects that a SS/MS of relatively high signal quality is attempting to connect with the radio access point (RAP) of another cell, or the BS detects that the parameters of initial ranging by the SS/MS are different significantly from those sent from the RS, for example above a preset difference threshold, or the network wishes to change the coverage area of the cell so as to achieve load equilibrium, a corresponding RS can be triggered to switch its operating mode. A specific switching procedure will be explained below in combination with FIG. 5a and FIG. 5b. Wherein FIG. 5a is a schematic structure view of the RS according to this embodiment for switching between two downlink operating modes, FIG. 5b is a schematic structure view of the BS according to this embodiment for controlling the RS to switch between two downlink operating modes.

If the monitoring unit of an RS in the downlink operating mode I detects that a SS/MS with signals of relatively high quality is trying to connect with the RAP of another cell, it informs the negotiating unit of the RS and the negotiating unit sends a signal to the BS through the RF transceiving and processing unit of the RS; the monitoring unit of the BS forwards the signals to the network and instructs the negotiating units of the RS and the BS to send and receive the negotiation data through their respective RF transceiving and processing units; when the negotiation is completed, if it is determined to switch the RS from the downlink operating mode I into the downlink operating mode II, the negotiating unit of the BS sends the instruction to switch the operating mode to the downlink operating mode II to a pre-transferring module, and the pre-transferring module instructs the RF transceiving and processing unit of the BS to send the downlink signaling to be transmitted to the RS before the transmission time; the negotiating unit of the RS send the instruction to switch the operating mode to the downlink operating mode II to the downlink mode controller, the downlink mode controller of the RS instructs the RF transceiving and processing unit of the RS to receive the downlink signaling sent from the BS before the transmission time and to transmit the downlink signaling jointly with the BS simultaneously during the transmission time.

If the monitoring unit of the BS detects that the parameters of initial ranging by a SS/MS are different significantly from those sent from an RS in the downlink operating mode I, it informs the network and instructs the negotiating unit of the BS to negotiate with that of the RS; when the negotiation is completed, if it is determined to switch the RS from the downlink operating mode I to the downlink operating mode II, the negotiating unit of the BS sends the instruction to switch the operating mode to the downlink operating mode II to the pre-transferring module, and the pre-transferring module instructs the RF transceiving and processing unit of the BS to send the downlink signaling to be transmitted to the RS before the transmission time; the negotiating unit of the RS sends the instruction to switch the operating mode to the downlink operating mode II to the downlink mode controller, the downlink mode controller of the RS instructs the RF transceiving and processing unit of the RS to receive the downlink signaling sent from the BS before the transmission time and to transmit the downlink signaling jointly with the BS simultaneously during the transmission time.

If it is the network that wishes to change the coverage area of the cell so as to achieve a load equilibrium, it informs the monitoring unit of the BS about this, the monitoring unit of the BS instructs the negotiating unit of the BS to negotiate with the negotiating unit of the RS; when the negotiation is completed, if it is determined to switch the RS from the downlink operating mode I to the downlink operating mode II, the negotiating unit of the BS sends the instruction to switch the operating mode to the downlink operating mode II to the pre-transferring module, and the pre-transferring module instructs the RF transceiving and processing unit of the BS to send the downlink signaling to be transmitted to the RS before the transmission time; the negotiating unit of the RS sends the instruction to switch the operating mode into the downlink operating mode II to the downlink mode controller, and the downlink mode controller of the RS instructs the RF transceiving and processing unit of the RS to receive the downlink signaling sent from the BS before the transmission time and to transmit the downlink signaling jointly with the BS simultaneously during the transmission time.

The process of switching from the downlink operating mode II to the downlink operating mode I is relatively simple: if the BS by long-term learning makes a conclusion that the downlink operating mode I is safe enough or it receives an instruction from the network, the operating mode can be switched from the downlink operating mode II to the downlink operating mode I, then the monitoring unit of the BS instructs the negotiating unit of the BS to negotiate with the negotiating unit of the RS; when the negotiation is completed, if it is determined to switch the RS from the downlink operating mode II to the downlink operating mode I, the negotiating unit of the BS sends the instruction to switch the operating mode to the downlink operating mode I to the pre-transferring module, the pre-transferring module instructs the RF transceiving and processing unit of the BS to stop sending the downlink signaling to the RS; the negotiating unit of the RS sends the instruction to switch the operating mode to the downlink operating mode I to the downlink mode controller, the downlink mode controller of the RS instructs the RF transceiving and processing unit of the RS to stop transmitting the downlink signaling, thus the RS no longer participates in the transmission of the downlink signaling.

If an RS is in the downlink operating mode II, the BS needs to pre-transfer the downlink signaling to be transmitted to the RS, and this pre-transferring of the downlink signaling will occupy wireless resources. The occupation status of the wireless resources within a cell depends on the quantity of the RS in the downlink operating mode II, this is because the adopted modulation/encoding scheme has to be determined according to the conditions of the operation link, typically according to the link conditions between the BS and the RS located at a position of most disadvantageous. Any increase in the number of the RSs in the downlink operating mode II will cause the deterioration of the conditions of operation link, and therefore more wireless resources are needed. To be brief, the more the RSs are in the downlink operating mode II, the more wireless resources have to be reserved for the transmission of the downlink signaling.

The ability of the RS to switch between different operating modes for transmitting the downlink signaling can provide a flexible deployment when the network environment changes, for example, providing a flexible deployment when a coverage problem appears or when the load equilibrium between cells is broken. Compared with the conventional ways of achieving the load equilibrium by changing the power of the downlink signaling or by tilting an antenna, the switching of the RS's operating mode is able to obtain irregular variation of the covering area, thus the real covering area can be flexibly changed according to practical demands, and it is more suitable for performing a more precise regulation of load equilibrium.

Second Embodiment

According to the second embodiment, a BS and more than one RS are deployed in a cell, according to the environments and the conditions of the network and under the control of the BS the RS is able to switch between different operating modes for transmitting downlink signaling. The second embodiment differs from the first embodiment in that: in the second embodiment, the RS can switch among three downlink operating modes, that is switch among a downlink operating mode I, a downlink operating mode II and a downlink operating mode III. When in the downlink operating mode I, the RS does not participate in the transmission of downlink signaling; in the downlink operating mode II, the RS transmits the downlink signaling jointly with the BS; in the downlink operating mode III, the RS transmits a preamble code jointly with the BS, since the preamble code is generally constant, the BS only needs to pre-transfer the preamble code to the RS once, after this no more pre-transferring cooperation needs to be executed, and the RS transmits the preamble code jointly with the BS during the transmission time. An RS in the downlink operating mode III cannot eliminate a coverage blind-spot, but to some extent it can attract more SS/MSs to the current cell. Therefore, if the network needs to attract more SS/MSs to the current cell while the wireless resources of the current cell are insufficient or there is no coverage blind-spot in the current cell, it can instruct a corresponding RS of the current cell to operate in the downlink operating mode III.

Figure 6:
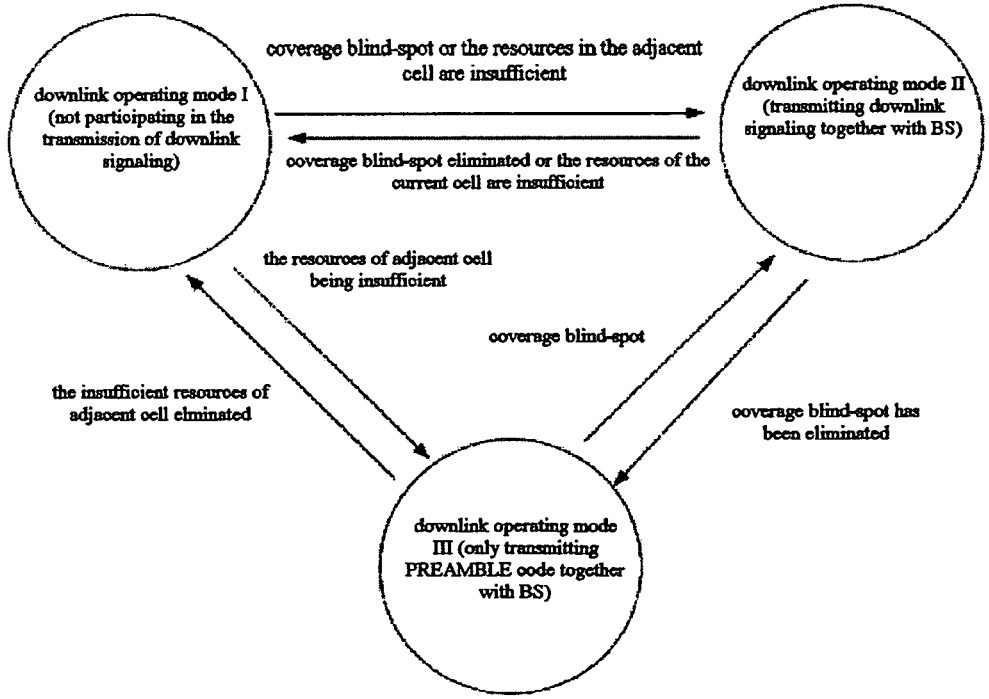
FIG. 6 illustrates the status machine of an RS switching among three downlink operating modes for transmitting downlink signaling.

FIG. 6 illustrates the status machine of the RS switching between three downlink operating modes for transmitting downlink signaling. It can be seen in FIG. 6 that, in this embodiment, the switching details of the RS are as follows:

when the RS operates in the downlink operating mode I, if it is detected that a coverage blind-spot appears in the current cell or the wireless resources of an adjacent cell are insufficient, the BS instructs the RS to switch into the downlink operating mode II; if the wireless resources of an adjacent cell are detected to be insufficient, it can also switch to the downlink operating mode III; and when the RS operates in the downlink operating mode II, if it is detected that the coverage blind spot in the current cell is eliminated or the wireless resources of the current cell are insufficient, the BS instructs the RS to switch to the downlink operating mode I; if the coverage blind-spot in the current cell is detected to have disappeared, it can also switch to the downlink operating mode III;

when the RS operates in the downlink operating mode III, if it is detected that the wireless resources of the adjacent cell are no longer insufficient, the BS instructs the RS to switch to the downlink operating mode I; if a coverage blind-spot is detected in the current cell, the BS instructs the RS to switch to the downlink operating mode II.

The RS capable of switching among three downlink operating modes is virtually the same as the RS shown in FIG. 5*a*, and the differences between them lie in that, after having received an instruction to switch to the operating mode III from the negotiating unit, the downlink mode controller of the control unit sends a control signal to the RF transceiving and processing unit, instructing the RF transceiving and processing unit to receive the preamble code pre-transferred from the BS before the transmission time, and to transmit the preamble code during transmission time jointly with the BS simultaneously to the SS/MS, and the operation of receiving the pre-transferred preamble code is executed only once.

The BS which instructs the RS to switch among three downlink operating modes is virtually the same as the BS shown in FIG. 5*b*, and the differences between them lie in that, the negotiating unit also sends out an instruction to switch into the downlink operating mode III; after the control unit has switched to the downlink operating mode III according to the instruction to switch from the negotiating unit, the pre-transferring module pre-transmits the preamble code to the RS operating in the downlink operating mode III, for the RS operating in the downlink operating mode III to transmit the preamble code jointly with the BS simultaneously to the SS/MS during the transmission time, and the operation of pre-transferring the preamble code is executed only once.

Third Embodiment

According to the third embodiment, one BS and more than one RS are provided in a cell, and under the control of the BS, the RS switches between different operating modes for transmitting uplink signaling, for example between an uplink operating mode I and an uplink operating mode II. The transmission of the uplink signaling within the cell is explained in detail below.

Since the RS is a digital relay device, during the transmission of the uplink signaling, after having received the uplink signaling transmitted from the SS/MS, the RF transceiving and processing unit transmits the signaling after having performed a digital baseband processing on it, and the quality of the signaling transmission is ensured because the digital baseband processing has been performed on the signaling. However, also because of the existence of the digital baseband processing, the time required for transmitting the uplink signaling will generally be increased. This has virtually no impact on normal signaling, but on some signaling having relatively high demands about delay, called delay-sensitive signaling hereafter, this delay of transmission time will probably cause some serious consequences. Generally, the PHY layer signaling for perception and scheduling of information channels, hybrid automatic requesting for re-transmission (HARQ), fast power control and/or fast adaptability modulation/encoding and so on are delay-sensitive signaling.

Figure 7:
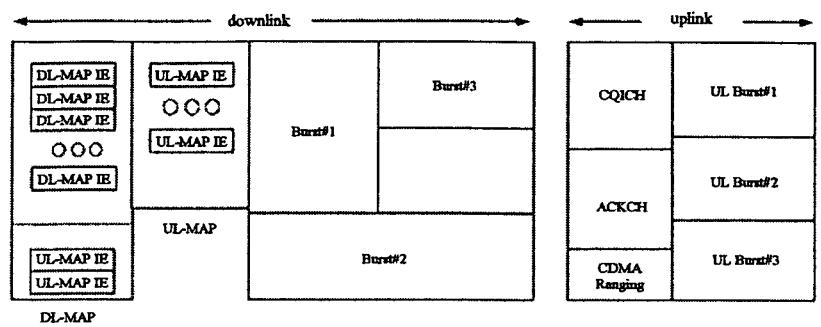
FIG. 7 illustrates the physical layer (PHY) frame structure of a system based on IEEE 802.16.

It will be explained by FIG. 7 below how a PHY frame in the system is configured. As shown in FIG. 7, the configuration of each PHY frame is represented by information units in the downlink mapping (DL-MAP) signaling associated with a downlink sub-frame and information units in the uplink mapping (UL-MAP) signaling associated with an uplink sub-frame. Particularly, in the case in which the BS centrally controls all activities within a cell, the BS controls the SS/MS activities of the uplink route through the information unit in the UL-MAP. In a system based on IEEE802.16, the uplink signaling transferred in channel quality indicator channels (CQICH), an acknowledgement channel (ACKCH) and CDMA ranging fields are typically used as the PHY layer signaling most relevant to some of the delay-sensitive control/management topics. Particularly, in a WiBro system compatible with IEEE 802.16e, the first three orthogonal frequency division multiple (CDMA) symbols in the uplink sub-frame are reserved as CQICH, ACKCH and CDMA ranging fields. In the present embodiment, the delay-sensitive uplink signaling occupies one or more than one successive orthogonal frequency division multiple (OFDM) symbols in the uplink sub-frame.

In the present embodiment, the RS can switch between two uplink operating modes for transmitting the uplink signaling. In an uplink operating mode I, the RS transmits the whole received uplink signaling after having performed digital baseband processing on it and the RS is used here as a routine digital relay device. In an uplink operating mode II, the RS transmits delay-sensitive signaling after having stored it and here the RS is used as an analog relay device; while delay-insensitive signaling is transmitted after having performed digital baseband processing on it and the RS is used here as a routine digital relay device. Thus it can be seen that, in the uplink operating mode II, the RS makes a difference between the delay-sensitive signaling and the delay-insensitive signaling, so as to reduce the transmission delay of the delay-sensitive signaling as much as possible.

When initiated, the RS can negotiate with the BS, and report the two operating modes it supports for transmitting uplink signaling; the BS determines an initial operating mode for the RS and controls the RS to operate in the determined operating mode.

Figure 8:
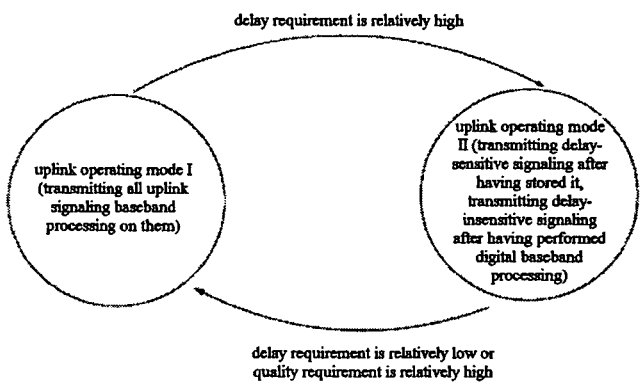
FIG. 8 illustrates the status machine of an RS switching between two uplink operating modes for transmitting uplink signaling.

FIG. 8 illustrates the status machine of two uplink operating modes for transmitting uplink signaling. It can be seen from FIG. 8 that, in the uplink operating mode I, the RS performs digital baseband processing on the whole uplink signaling, where the time delay of the signaling is relatively large while the transmission quality is relatively good; and in the uplink operating mode II, the RS does not perform digital baseband processing on uplink signaling, so as to reduce the delay of the delay-sensitive signaling, while the transmission quality is relatively poor. Therefore, which uplink operating mode is to be adopted in a particular case is decided according to practical requirements, that is, the uplink operating mode II is adopted when the requirement about delay is strict; the uplink operating mode I is adopted when the delay requirement is not high, especially when the quality requirement is strict. If the BS determines that current requirement about delay is relatively high, it instructs the RS to switch from the uplink operation I to the uplink operating mode II; if the BS determines that the current requirement about delay is relatively low, or the requirements about transmission quality is relatively high, it instructs the RS to switch from the uplink operation II to the uplink operating mode I.

Figure 9A:
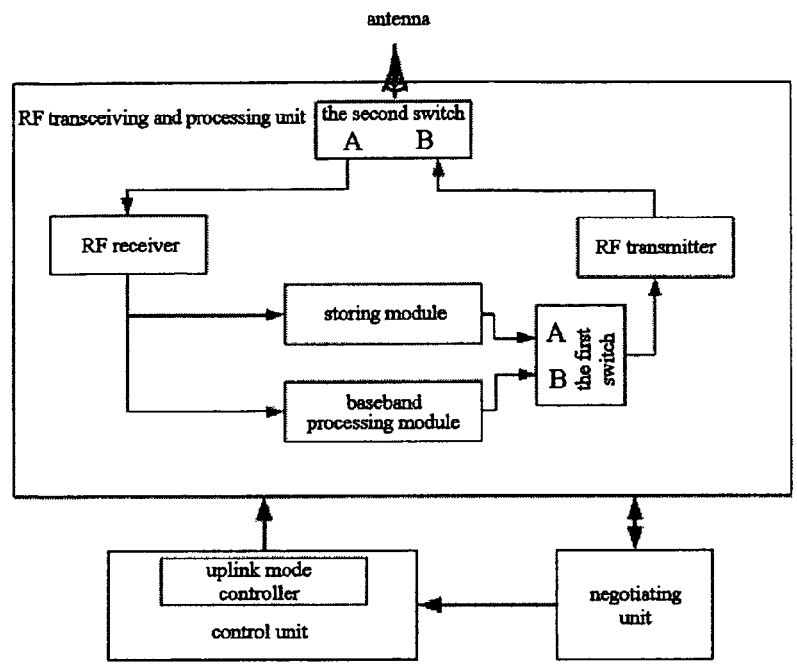
FIG. 9a is a schematic structure view of an RS switching between two uplink operating modes according to a third embodiment.

FIG. 9a is a schematic structure view of an RS switching between two uplink operating modes according to the third embodiment. As shown in FIG. 9a, the RS of the embodiment comprises an RF transceiving and processing unit, a negotiating unit, a control unit and a monitoring unit.

The negotiating unit sends out to the control unit an instruction to switch operating mode after having negotiated with the BS.

According to the instruction to switch operating mode sent from the negotiating unit, the control unit controls the RF transceiving and processing unit to switch between two operating modes for transmitting uplink signaling.

The control unit comprises an uplink mode controller, for instructing the RF transceiving and processing unit to transmit the whole uplink signaling after having performed the digital baseband processing on it after the negotiating unit has sent it an instruction to switch to the uplink operating mode I; and for instructing the RF transceiving and processing unit, after the negotiating unit has sent it an instruction to switch to the uplink operating mode II, to receive the delay-sensitive uplink signaling at an uplink signaling gap set by the base station, to transmit the delay-sensitive uplink signaling at an amplified gap reserved by the base station for the relay station after having stored it, and to receive the delay-insensitive uplink signaling, and to transmit the delay-insensitive uplink signaling after having performed the digital baseband processing on it.

Wherein, the RF transceiving and processing unit comprises an RF receiver, a baseband processing module and an RF transmitter.

In the uplink operating mode I, the baseband processing module performs digital baseband processing on the whole uplink signaling received by the RF receiver, and the RF transmitter transmits the whole uplink signaling; and in the uplink operating mode II, after the storage module has stored the delay-sensitive uplink signaling received by the RF receiver during the uplink signaling gap set by the base station, the RF transmitter transmits the delay-sensitive uplink signaling during the amplified gap reserved by the base station; and after the baseband processing module has performed the digital baseband processing to the delay-insensitive uplink signaling received by the RF receiver, the RF transmitter transmits the delay-insensitive uplink signaling.

Further, the RF transceiving and processing unit comprises a first switch and a second switch. Wherein the first switch has a port A and a port B, for respectively outputting the signals from the storage module and the baseband processing module into the RF transmitter. The second switch also has a port A and a port B, and when only the port A is opened, only the RF emitter is connected to an antenna, the antenna can only transfer RF signals to the RF receiver; when only the port B is opened, only the RF emitter is connected to the antenna, the antenna can only transmit out the signals sent from the RF transmitter, so as to avoid the self-oscillation caused by the superposition of the receiving and transmitting; when the ports A and B are opened simultaneously, both the RF receiver and the RF transmitter can be connected to the antenna, and then it can receive as well as the transmit.

When the RS is in the uplink operating mode I, the uplink mode controller instructs the first switch only to open the port B, and in this mode the storage module does not work, the whole uplink signaling is transmitted by the RF transmitter after having performed the digital baseband processing by the baseband processing module;

when the RS operates in the uplink operating mode II, the uplink mode controller receives information extracted by the baseband control module from the UL-MAP, and determines the gap of the delay-sensitive signaling in the uplink signaling (called uplink signaling gap) and the gap for transmitting the delay-sensitive signaling (amplified gap); as described above, since the delay-sensitive uplink signaling of PHY layer are transmitted in several adjacent OFDM symbols, it is convenient to determine the uplink signaling gap and the amplified gap.

Within the uplink signaling gap, the uplink mode controller can execute the following operations:

instructing the second switch to open only its port A, so that the RF receiver receives the delay-sensitive uplink signaling;

instructing the storage module to prepare for storing the delay-sensitive uplink signaling received by the RF receiver; and within the amplified gap, the uplink mode controller can execute the following operations:

instructing the first switch to open only its port A, so as to transfer the delay-sensitive uplink signaling in the storage module to the RF transmitter; and instructing the second switch to open only its port B, so that the RF transmitter transmits the delay-sensitive uplink signaling at an amplified power.

Within other gaps in the uplink sub-frame, the uplink mode controller can execute the following operations:

instructing the second switch to open its port A, so that the RF receiver receives other uplink signaling;

instructing the baseband processing module to process the uplink signaling sent from the RF receiver, that is, to perform the digital baseband processing;

instructing the first switch to open its port B, so as to output the uplink signaling sent from the baseband processing module to the RF transmitter; and instructing the second switch to open its port B, so as to transmit via the antenna the uplink signaling supplied by the RF transmitter.

Preferably, the negotiating unit is also used to negotiate with the BS when the RS is initiated, to report the operating modes it supports for transmitting uplink signaling, and after having received the initial operating mode instruction returned from the BS, to instruct the uplink mode controller of the control unit to execute a corresponding operation.

As described above, for the delay-sensitive signaling, the RS is used as an analog relay device, in which the digital baseband processing is not performed on the signaling and only a certain delay is imposed on the signaling, which is outputted at an amplified power. Since this delay is small, it can ensure that the transmission delay of delay-sensitive signaling is small. As for other uplink signaling, especially for some quality-sensitive signaling, the RS is still used as a digital relay device, and the signaling is transmitted after having performed the digital baseband processing, thus although there exists a relatively large delay, the quality of the signal can be ensured.

Figure 9B:
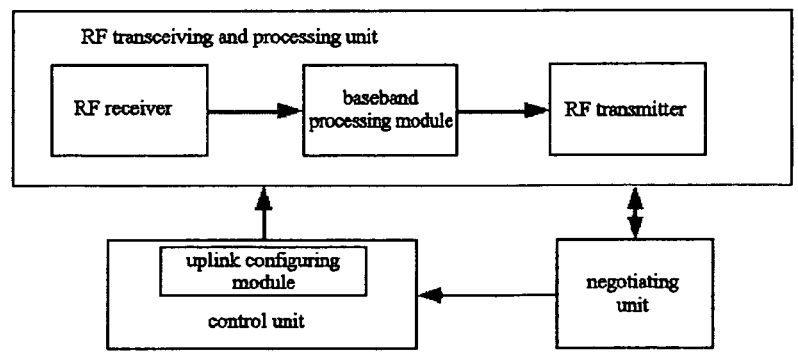
FIG. 9b is a schematic structure view of a BS for controlling the RS to switch between two uplink operating modes according to the third embodiment.

FIG. 9b is a schematic structure view of a BS for controlling the RS so as to switch between two uplink operating modes according to the second embodiment. It can be seen in FIG. 9b that the BS of this embodiment comprises: an RF transceiving and processing unit, a negotiating unit and a control unit.

The negotiating unit negotiates with an RS to determine the operating mode of the RS for transmitting uplink signaling, informs the RS, and sends to the control unit an instruction to switch operating mode.

Preferably, the negotiating unit is also used to decide, after having received from the RS the operating modes it supports for transmitting downlink signaling reported when it is initiated, on an initial operating mode, and to inform the RS.

The control unit controls the RS so as to switch between two uplink operating modes through the RF transceiving and processing unit according to the instruction to switch operating mode sent from the negotiating unit.

The control unit comprises an uplink allocation module for determining the delay-sensitive signaling, the signaling gap where the delay-sensitive uplink signaling is located in an uplink sub-frame, an amplified gap reserved for the RS to transmit the delay-sensitive uplink signaling, and then for informing the RS through the RF transceiving and processing unit; the control unit can also control the BS so as to perform corresponding processing to the uplink signaling after having received it from the RS, and when the BS receives the uplink signaling from the RS, a plurality of combination schemes can be adopted to process the unlink signaling of original PHY layer and delay-sensitive signaling.

In the uplink operating mode II, the process for the BS to instruct the RS to transmit uplink signaling can comprise the following steps:

Step 1: the BS determines the transmitting gaps, i.e. uplink signaling gaps, of the delay-sensitive signaling aiming at various RSs within the cell, determines the amplified gaps in uplink sub-frames which have equal length to the uplink signaling gaps, and informs the respective RSs of the uplink signaling gap and amplified gap, for example, the RSs can be informed using the information units in the UL-MAP. The amplified gap and the uplink signaling gap in the uplink sub-frame can also be unequal.

Step 2: within the unlink signaling gap determined by the BS, the RS, as an analog relay device, receives and stores the delay-sensitive signaling, and transmits it within the amplified gap in the uplink sub-frame; at other times, the RS acts as a routine digital relay device to transmit other received uplink signaling after having performed digital baseband processing on it.

Step 3: the BS receives the delay-sensitive uplink signaling sent from the RS according to the determined amplified gap in the uplink sub-frame, and receives other uplink signaling within other gaps.

During a practical implementing process, it is necessary to set appropriate amplified gap and corresponding amplifying gain to achieve the reliable transfer of the delay-sensitive PHY layer uplink signaling, so as to facilitate the implementation of channel-aware technology in a cell comprising the RSs under the control of the BS. The number of the RSs having the functions of the two modes described above for transmitting uplink signaling and the amplifying gain adopted by the respective RSs can be configured adaptively by the BS (and/or network) according to various factors, and these factors comprise, but are not limited to, the load levels of the respective RSs and that of the respective RSs of adjacent cells.

The type of the PHY layer uplink signaling processed by the RS can be modified adaptively by the BS (and/or network), and this modification will result in the modification of the lengths of the signaling gaps and that of the corresponding amplified gaps. Such adaptive modification can be simplified by defining the associated information units of the UL-MAP and the amplified gaps. The BS (and/or network) can adaptively coordinate the amplified gaps for the respective RSs so as to perform the interference management. For example, it can define groups among the RSs of two functions, and make the RSs of the same group transmit in the same gap.

The BS can assign N different amplified gaps for M RSs in the cell, and reserve one or more than one of the N amplified gaps for each RS, wherein M is a positive integer, and N is an integer; the RS transmits the received delay-sensitive signaling within the one or several of the N amplified gaps reserved for it by the BS. Thus, the RSs can transmit the delay-sensitive signaling in several different amplified gaps, so as to make the transmission quality of the delay-sensitive signaling better.

Referring to FIG. 1 again, a cell comprises a BS, RS1, RS2, MS1 and MS2. Since RS1 is close to MS1 and RS2 is close to MS2, usually the signals received by RS1 from MS1 are stronger than the signals of MS2, the signals received by RS2 from MS2 are stronger than that of MS1. Therefore, the amplified signal transmitted by RS1 can carry more useful information from MS1, while the amplified signal transmitted by RS2 can carry more useful information from MS2. The BS can make use of this feature to assign non-superposition amplified gaps for RS1 and RS2, and then decode the information from RS1 and RS2 respectively, for example, decode the signaling from MS1 by using the amplified signal from RS1, and decode the signaling from MS2 by using the amplified signal from RS2.

The function of "storing-delaying-amplifying" delay-sensitive signaling can be implemented in a frequency selectable manner, so as to make the configuring of the uplink sub-frame more flexible, and to improve the spectrum efficiency.

Figure 10:
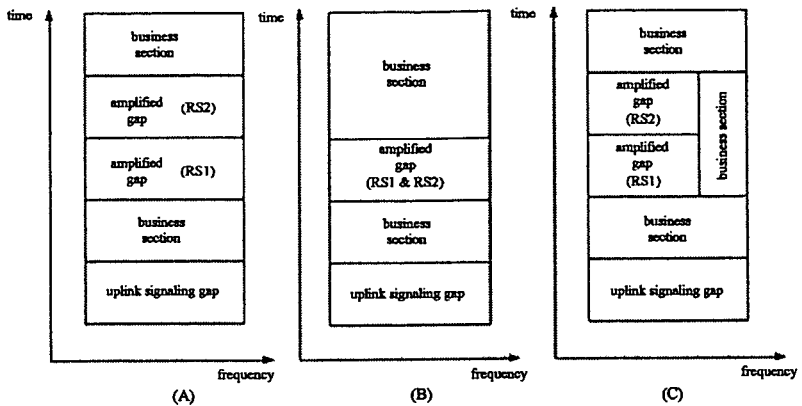
FIG. 10 illustrates the configurations of three uplink subframes.

FIG. 10 illustrates the configuration of three possible uplink sub-frames, in FIG. 10 the vertical axis is time and the horizontal axis is frequency. It can be seen in FIG. 10 that, in the case A, RS1 and RS2 are assigned with amplified gaps of non-superposition, that is, RS1 and RS2 transmit respectively the delay-sensitive signaling within different amplified gaps at the same frequency; in the case B, RS1 and RS2 are assigned with the same amplified gap, that is, RS1 and RS2 transmit the delay-sensitive signaling within the same amplified gaps at the same frequency, and in this way the gaps can be saved; in the case C, RS1 and RS2 are assigned with amplified gaps of non-superposition, and the analog relay function has the ability to select frequency, that is, RS1 and RS2 transmit delay-sensitive signaling within different amplified gaps at the same frequency, and business data are transmitted within these two amplified gaps at different frequencies.

This embodiment can select appropriate transmission modes for uplink signaling according to different delay requirements, and this is advantageous for the network to select different transmission schemes for uplink signaling according to different situations and conditions.

Fourth Embodiment

According to the fourth embodiment, a BS and more than one RS are provided in a cell, and under the control of the BS, the RS switches between different operating modes for transmitting uplink signaling, this embodiment differs from the third embodiment in that the RS of this embodiment switches between three uplink operating modes, for example, it switches between an uplink operating mode I, an uplink operating mode II and an uplink operating mode III. In the uplink operating mode I, the RS transmits the whole received uplink signaling after having performed digital baseband processing on it, and in this case the RS is used as a routine digital relay device. In the uplink operating mode II, the RS transmits delay-sensitive signaling after having stored it, and the RS acts as an analog relay device; while it transmits delay-insensitive signaling after having performed digital baseband processing on it, and the RS acts in a routine digital relay state. In the uplink operating mode III, the RS transmits the whole uplink signaling after having stored it.

Figure 11:
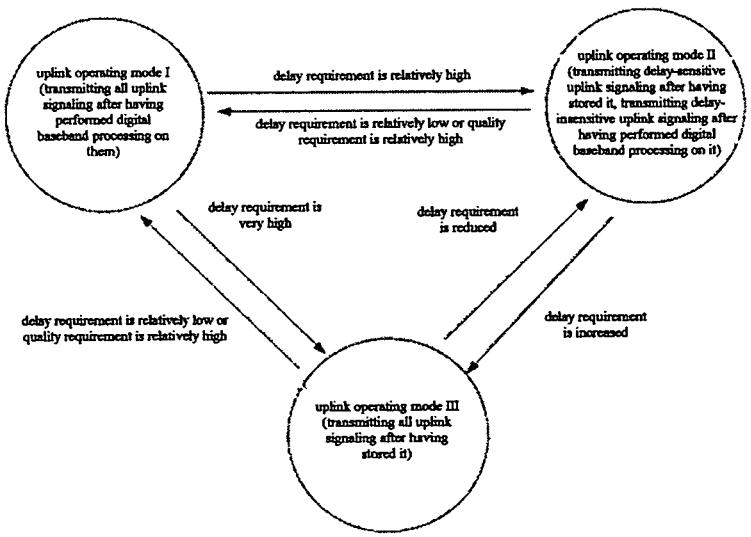
FIG. 11 illustrates the status machine of an RS switching among three uplink operating modes for transmitting uplink signaling.

FIG. 11 illustrates the status machine for the transmission of signaling in three operating modes. It can be seen in FIG. 11 that, in the present embodiment, the status switching process of the uplink operating mode is as follows:

when the RS operates in the uplink operating mode I, if the BS makes a judgment that a current time-delay requirement is increased to a first time-delay threshold, it instructs the RS to switch from the uplink operating mode I to the uplink operating mode III; if the BS makes a judgment that the current time-delay requirement is increased to a second time-delay threshold, it instructs the RS to switch from the uplink operating mode I into the uplink operating mode II, and the first threshold is higher that the second threshold.

When the RS operates in the uplink operating mode II, if the BS makes a judgment that the current time-delay requirement is increased to the first time-delay threshold, it instructs the RS to switch from the uplink operating mode II into the uplink operating mode III; if the BS makes a judgment that the current time-delay requirement is dropped to below the second time-delay threshold or a quality requirement is increased to a first quality threshold, it instructs the RS to switch from the uplink operating mode II into the uplink operating mode I.

When the RS operates in the uplink operating mode III, if the BS makes a judgment that the current time-delay requirement is dropped to below the first time-delay threshold, it instructs the RS to switch from the uplink operating mode III into the uplink operating mode II; if the BS determines that the current time-delay requirement is dropped to below the second time-delay threshold or the quality requirement is increased to the first quality threshold, it instructs the RS to switch from the uplink operating mode III to the uplink operating mode I.

The RS capable of switching among three uplink operating modes is virtually the same as the RS shown in FIG. 9a, and the differences between them are that after the negotiating unit sends an instruction to switch into the uplink operating mode I, the uplink mode controller of the control unit instructs the RF transceiving and processing unit to transmit the whole uplink signaling after having stored it. In the downlink operating mode III, the RS acts as an analog relay device.

The BS capable of instructing the RS to switch among three uplink operating modes is virtually the same as the BS shown in FIG. 9b, and the differences between them are that the negotiating unit also sends out the instruction to switch into the uplink operation III.

Fifth Embodiment

Figure 12:
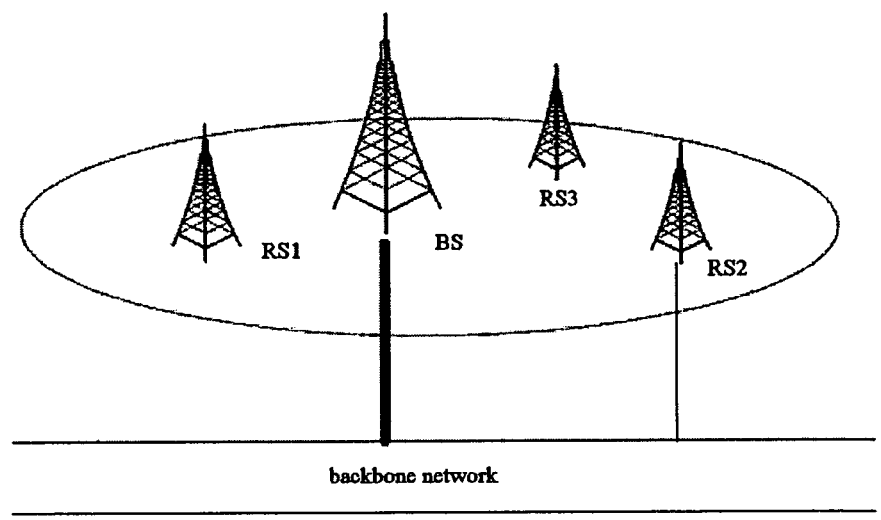
FIG. 12 is a schematic composition view of a cell comprising an RS having a direct connection to a backbone network.

In the fifth embodiment, there exist wired connections between some of the RSs in a cell and a backbone network, as shown in FIG. 12, there exist between a BS and the backbone network a high quality wired connection, but RS1 and RS3 have no connection with the backbone network, while RS2 has a wired connection with the backbone network, too. Although the performance of the wired connection between RS2 and the backbone network is lower than that between the BS and the backbone network, it can also be used in the same way to transmit data.

Figure 13A:
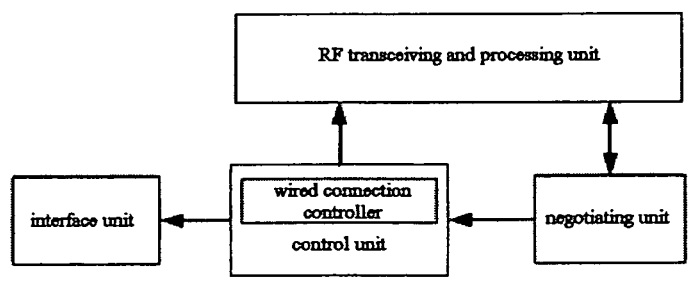
FIG. 13*a* is a schematic structure view of the RS according to a fifth embodiment, which switches between at least two operating modes for transmitting signaling and has a wired connection to a backbone network.

FIG. 13a illustrates a schematic structure view of the proposed RS, which switches between at least two operating modes for transmitting signaling and has a wired connection to a backbone network.

It can be seen in FIG. 13a that, the RS comprises an RF transceiving and processing unit, a negotiating unit, a control unit and an interface unit.

Wherein the RF transceiving and processing unit performs the basic functions of RF receiving, digital baseband processing, RF transmitting and so on; the negotiating unit sends an instruction to switch operating mode to the control unit after having negotiated with the BS of the cell; and the control unit controls the RF transceiving and processing unit to switch between at least two operating modes for transmitting signaling according to the instruction to switch operating mode sent from the negotiating unit.

The negotiating unit is also used to report the wired connection between it and the backbone network, and after having received the instruction of whether to use the wired connection returned from the BS, to inform the control unit.

Preferably, the negotiating unit can also negotiate with the BS when it is initiated, report the wired connection between it and the backbone network, and inform the control unit after having received the instruction of whether to use the wired connection returned from the BS.

The control unit also comprises a wired connection controller, for instructing, after having received the instruction of using the wired connection sent from the negotiating unit, the interface unit to use the wired connection to forward data.

Under the instructions of the wired connection controller, the interface unit uses the connection between the RS and the backbone network to forward data.

Figure 13B:
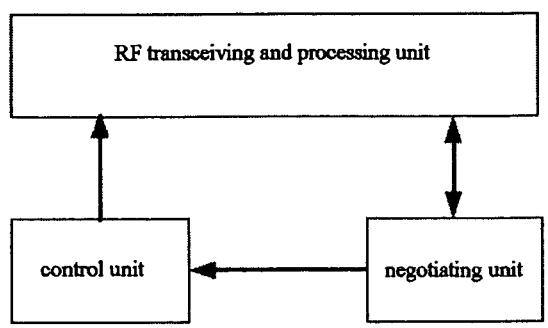
FIG. 13*b* is a schematic structure view of the BS according to the fifth embodiment, for controlling the RS to switch between at least two operating modes for transmitting signaling, and having a wired connection to a backbone network.

FIG. 13b illustrates the structure of the proposed BS for controlling the RS to switch between at least two operating modes for transmitting signaling and for controlling the RS to use the connection between it and a backbone network. It can be seen in FIG. 13b that the BS comprises an RF transceiving and processing unit, a negotiating unit and a control unit.

Wherein, the RF transceiving and processing unit performs the basic functions of RF receiving, digital baseband processing, RF transmitting and so on; the negotiating unit sends an instruction to switch operating mode to the control unit after having negotiated with the RS; and the control unit controls the RS to switch between at least two operating modes for transmitting signaling through the RF transceiving and processing unit according to the instruction to switch operating mode sent from the negotiating unit.

The negotiating unit can also make a judgment, after having received a report from the RS about its wired connection with the backbone network, whether it is needed to make use of the wired connection according to load: if the load of the current cell is not heavy, and/or the quality of the wired connection is poor, it decides not to use the wired connection, and instructs the RS not to use its wired connection with the backbone network, all business data and signaling sent to and from the backbone network are transmitted through the BS. If the load of the current cell is relatively heavy, and/or the quality of the wired connection is quite good, the wired connection can be used, and the RS is instructed to use the wired connection for forwarding at least part of the business data and part of the signaling. In this case, the BS still controls the cell's air ports, i.e. the wireless connections of the cell, specifically it comprises the wireless connections for all SS/MSs to communicate with RAPs (including BS and provided RS), the connections for all RSs without wired connection with the backbone network to communicate with the BS, and the wireless connections for all RSs having wired connection with the backbone network to communicate with the BS when required.

According to QoS requirement and under the control of the BS, the RS transmits/receives data as much as possible through its own wired connection with the backbone network, where the data can comprise business data and signaling. That is to say, the RS can either send the data of the SS/MSs to the backbone network, or send directly the data sent from the backbone network to the SS/MSs, but this activity must be under the centralized control of the BS.

It needs to be explained that, to achieve the direct transmission of data to the backbone network or transmission of the data from the backbone network to the SS/MSs, the RS has to have a functional entity of above layer 2.

When an RS uses a wired connection, the RS can be used by the BS to determine the route of a multi-hop SS/MS, for example, in FIG. 12, those SS/MSs communicating directly with RS3 can be assigned with a route, and their business data can be sent to the backbone network directly via the RS, without having to go through the BS; and the business data from the backbone network can also be sent directly to these SS/MSs, also without having to go through the BS.

Because of the use of the wired connection between the RS and the backbone network, more SS/MSs can be accommodated in one cell without requiring extra wireless resources. Moreover, when the quality of the wired connection between the RS and the backbone network is good enough, higher QoS services can be provided to multi-hop SS/MSs.

The RS and BS may have the combined functions of all the embodiments described above. When the RS is connected to the network to start its initial negotiation with the BS, it requests the BS to determine its operating mode in three cases, the BS determines respectively the operating modes of the RS for transmitting downlink signaling, for transmitting uplink signaling, and when the RS reports its wired connection with the backbone network, determines whether to use the wired connection. Then, the BS will instruct the RS to operate respectively in which operating modes in these three cases. During the operating process, the operating modes of the RS can be regulated according to practical situations.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004).

The invention claimed is:

1. A method for transmitting data in mobile communication and for application in a cell having a base station and more than one relay station comprising, switching, by at least one of the relay stations, under the control of said base station, between at least two operating modes when transmitting a downlink signaling, wherein said at least two operating modes comprise an operating mode of not participating in the transmission of the downlink signaling and an operating mode of jointly transmitting the downlink signaling with the base station, and wherein when said at least one relay station is in the operating mode of jointly transmitting the downlink signaling with the base station, said at least one relay station receives a downlink signaling pre-transmitted by the base station before a transmission time; and at the transmission time, the at least one relay station and the base station transmit said downlink signaling to the user stations/mobile stations simultaneously.

2. The method as claimed in claim 1, wherein when the base station detects a coverage blind-spot in the cell, after having negotiated with a relay station close to the coverage blind-spot in the cell, the base station instructs the relay station to switch from the operating mode of not participating in the transmission of the downlink signaling into the operating mode of jointly transmitting the downlink signaling with the base station.

3. The method as claimed in claim 2, wherein it is confirmed that the base station detects the occurrence of the coverage blind-spot in the cell when the base station detects that a difference between an initial ranging parameter of more than one user station/mobile station and a measurement parameter reported by the relay stations is larger than a preset difference threshold.

4. The method as claimed in claim 2, wherein when the base station confirms that the coverage blind-spot in the cell has been eliminated, after having negotiated with the relay station that transmits the downlink signaling jointly with the base station in the cell, the base station instructs the relay station to switch back to the operating mode of not participating in the transmission of the downlink signaling.

5. The method as claimed in claim 4, wherein the steps for the base station to confirm the elimination of the coverage blind-spot in the cell comprise:

the base station reduces step by step the signaling transmitting power of the relay station that transmits the downlink signaling jointly with the base station in the cell and observes the responses from user stations/mobile stations, and if after the transmitting power has been reduced to a normal transmission power, the user stations/mobile stations are still capable of receiving normally, then the base station determines that the coverage blind-spot in the cell has been eliminated.

6. The method as claimed in claim 1, wherein when the at least one relay station detects a coverage blind-spot in the cell, after having negotiated with the base station, the at least one relay station switches from the operating mode of not participating in the transmission of the downlink signaling into the operating mode of jointly transmitting the downlink signaling with the base station.

7. The method as claimed in claim 6, wherein it is confirmed that said at least one relay station detects the occurrence of the coverage blind-spot in the cell when said at least one relay station detects during an idle time slot that more than one user station/mobile station is attempting to connect to a radio access point of another cell, but the signal quality from the user stations/mobile stations received by said at least one relay station is above a preset signal quality threshold.

8. The method as claimed in claim 1, wherein when a network confirms that wireless resource of a cell is currently sufficient and that of an adjacent cell is insufficient, by instructing the base station in the cell to negotiate with a relay station in the cell close to the adjacent cell and to make the relay station switch from the operating mode of not participating in the transmission of the downlink signaling into the operating mode of jointly transmitting the downlink signaling with the base station; and when the network confirms that the wireless resource of a cell is currently insufficient and that of an adjacent cell is sufficient, by instructing the base station in the cell to negotiate with the relay station in the cell close to the adjacent cell and to make the relay station switch from the operating mode of jointly transmitting the downlink signaling with the base station into the operating mode of not participating in the transmission of the downlink signaling.

9. The method as claimed in claim 1, wherein it also comprises:

said relay station performing an initial negotiation with said base station when it is initiated and reporting all operating modes it supports for signaling transmission; and said base station designating an initial operating mode for said relay station, and controlling said relay station to operate in the designated initial operating mode.

10. A system for transmitting data in mobile communication, comprising:

a base station; and a plurality of relay stations in a cell of the base station, wherein under the control of said base station, at least one of said plurality of relay stations switches between at least two operating modes when transmitting a downlink signaling, wherein said at least two operating modes comprise an operating mode of not participating in the transmission of the downlink signaling and an operating mode of jointly transmitting the downlink signaling with the base station, and wherein when said at least one relay station is in the operating mode of jointly transmitting the downlink signaling with the base station, said at least one relay station receives a downlink signaling pre-transmitted by the base station before a transmission time; and at the transmission time, the at least one relay station and the base station transmit said downlink signaling to the user stations/mobile stations simultaneously.

11. A relay station positioned in a cell of a wireless cellular network for transmitting data in mobile communication, comprising:

an RF transceiving and processing unit;

a negotiating unit; and a control unit, wherein said negotiating unit sends an operating mode switching instruction to the control unit after having negotiated with a base station in said cell; and said control unit controls the RF transceiving and processing unit so as to switch between at least two operating modes for transmitting a downlink signaling according to the mode switching instruction sent from the negotiating unit, wherein said at least two operating modes comprise a downlink operating mode I of not participating in the transmission of a downlink signaling and a downlink operating mode II of transmitting jointly the downlink signaling with the base station, wherein said control unit comprises:

a downlink mode controller instructing the RF transceiving and processing unit to stop transmitting the downlink signaling, after the negotiating unit has sent the RF transceiving and processing unit an instruction to switch the operating mode into the downlink operating mode I, and instructing the RF transceiving and processing unit to receive a downlink signaling pre-transmitted from the base station before a transmission time and to transmit said downlink signaling to a user station/mobile station jointly with the base station at the transmission time after the negotiating unit has sent the RF transceiving and processing unit an instruction to switch the operating mode into the downlink operating mode II.

12. The relay station as claimed in claim 11, wherein said RF transceiving and processing unit comprises an RF receiver, an RF transmitter, and a baseband processing module; and in the operating mode II for transmitting the downlink signaling, said RF receiver receives a pre-transmission of the downlink signaling transmitted from the base station before the transmission time, said baseband processing module performs digital baseband processing on said downlink signaling, and said RF transmitter transmits the downlink signaling jointly with the base station at the transmission time.

13. The relay station as claimed in claim 11, wherein the operating modes of said signaling transmission further comprise a downlink operating mode Ill of transmitting a preamble code jointly with the base station; and said control unit comprises:

a downlink mode controller instructing the RF transceiving and processing unit to stop transmitting the downlink signaling after the negotiating unit has sent the RF transceiving and processing unit an instruction to switch the operating mode into the downlink operating mode I, instructing the RF transceiving and processing unit to receive a downlink signaling pre-transmitted from the base station before a transmission time and to transmit the downlink signaling to a user station/mobile station jointly with the base station at the transmission time after the negotiating unit has sent the RF transceiving and processing unit an instruction to switch the operating mode into the downlink operating mode II, and instructing the RF transceiving and processing unit to transmit the preamble code to the user station/mobile station jointly with the base station at the transmission time after the negotiating unit has sent the RF transceiving and processing unit an instruction to switch the operating mode into the downlink operating mode III.

14. The relay station as claimed in claim 11, further comprising:

a monitoring unit reporting to the base station and instructing the negotiating unit to negotiate with the base station when the monitoring unit detects a coverage blind-spot in the cell.

15. A base station for transmitting data in mobile communication, positioned in a cell of a multi-hop wireless cellular network, comprising:

an RF transceiving and processing unit;
a negotiating unit; and
a control unit, wherein said negotiating unit sends an instruction to switch an operating mode to a relay station and the control unit after having negotiated with the relay station in the cell; and said control unit controls said relay station to switch between at least two operating modes of a downlink signaling transmission via the RF transceiving and processing unit according to the instruction to switch operating mode sent from the negotiating unit, wherein said at least two operating modes comprise an operating mode of not participating in the transmission of the downlink signaling and an operating mode of jointly transmitting the downlink signaling with the base station, wherein said control unit comprises:

a pre-transferring module instructing the RF transceiving and processing unit to send a downlink signaling to be transmitted to the relay station in the operating mode of jointly transmitting downlink signaling with the base station before a transmission time.

16. The base station as claimed in claim 15, further comprising:

a monitoring unit reporting to a network when the monitoring unit detects a coverage blind-spot in the cell and when the monitoring receives a report from the relay station that a coverage blind-spot appears in the cell, and at the same time instructing the negotiating unit to negotiate with the relay station.

17. The base station as claimed in claim 15, wherein said control unit comprises:

an uplink allocation module determining an uplink signaling gap in which the delay-sensitive uplink signaling is located in an uplink subframe for reserving an amplified gap for transmitting the delay-sensitive uplink signaling for the relay station in the operating mode of transmitting delay-sensitive uplink signaling after having stored the uplink signaling and transmitting delay-insensitive uplink signaling after having performed digital baseband processing on uplink signaling, and then informing said relay station of the determined uplink signaling gap and the amplified gap via the RF transceiving and processing unit.

18. The base station as claimed in claim 15, wherein said negotiating unit is also used to select an operating mode and then inform the relay station of the operating mode after having received a report about the operating modes the negotiating unit supports sent from the relay station when it is initiated.

19. The base station as claimed in claim 15, wherein said negotiating unit is also used to decide, after having received a report from the relay station when it is initiated that a wired connection exists between the relay station and a backbone network, whether or not to use the wired connection and then inform the relay station.

* * * * *

UNITED STATES PATENT AND TRADEMARK OFFICE
CERTIFICATE OF CORRECTION

| | | |
|---|---|---|
| PATENT NO. | : 8,805,276 B2 | Page 1 of 1 |
| APPLICATION NO. | : 12/449247 | |
| DATED | : August 12, 2014 | |
| INVENTOR(S) | : Hui Li et al. | |

It is certified that error appears in the above-identified patent and that said Letters Patent is hereby corrected as shown below:

On the Title Page and on the Page 1 of the Specification

Item [54], and in Column 1, Line 2, (Title), After "Transmitting data" insert -- in --.

Signed and Sealed this
Fourth Day of November, 2014

Michelle K. Lee
*Deputy Director of the United States Patent and Trademark Office*